United States Patent
Aoki

(10) Patent No.: US 9,106,826 B2
(45) Date of Patent: Aug. 11, 2015

(54) IMAGE CAPTURING APPARATUS AND FOCUSING CONTROL METHOD

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/184,117

(22) Filed: Feb. 19, 2014

(65) Prior Publication Data

US 2015/0085178 A1    Mar. 26, 2015

(30) Foreign Application Priority Data

Sep. 20, 2013 (JP) .................. 2013-195890

(51) Int. Cl.
 H04N 5/225    (2006.01)
 H04N 5/232    (2006.01)
 H04N 5/374    (2011.01)
 H04N 5/372    (2011.01)

(52) U.S. Cl.
 CPC ........... *H04N 5/23212* (2013.01); *H04N 5/372* (2013.01); *H04N 5/374* (2013.01)

(58) Field of Classification Search
 CPC .................. H04N 5/23212; H04N 5/3696
 USPC ................................. 348/345–356
 See application file for complete search history.

(56) References Cited

U.S. PATENT DOCUMENTS

| | | | | |
|---|---|---|---|---|
| 2007/0206937 | A1* | 9/2007 | Kusaka | 396/89 |
| 2008/0309771 | A1* | 12/2008 | Takahashi | 348/208.4 |
| 2010/0150538 | A1* | 6/2010 | Ono et al. | 396/104 |
| 2013/0242172 | A1* | 9/2013 | Hamano | 348/349 |
| 2014/0320709 | A1* | 10/2014 | Aoki et al. | 348/273 |

FOREIGN PATENT DOCUMENTS

| | | |
|---|---|---|
| JP | 2010-139942 A | 6/2010 |
| JP | 2010-204294 A | 9/2010 |
| WO | WO 2013/047160 A1 | 4/2013 |

* cited by examiner

*Primary Examiner* — Twyler Haskins
*Assistant Examiner* — Dwight C Tejano
(74) *Attorney, Agent, or Firm* — Birch, Stewart, Kolasch & Birch, LLP

(57) ABSTRACT

An image capturing apparatus, includes: an image capturing element configured to capture an image of a subject; and a focusing control unit configured to perform a focusing control by a phase difference AF method using detection signals of first signal detection units and second signal detection units; a matching degree generation unit configured to generate a first matching degree which corresponds to a matching degree of two images captured by a first pair using the detection signals of the respective signal detection units of the first pair, and a second matching degree which corresponds to a matching degree of two images captured by a second pair using the detection signals of the respective signal detection units of the second pair; and a credibility determination unit configured to determine credibility of the focusing control by the phase difference AF method based on the first matching degree and the second matching degree.

6 Claims, 14 Drawing Sheets

IMAGE CAPTURING APPARATUS AND FOCUSING CONTROL METHOD

CROSS-REFERENCE TO RELATED APPLICATIONS

This application is based on and claims priority under 35 U.S.C. 119 from Japanese Patent Application No. 2013-195890 filed on Sep. 20, 2013, the entire content of which is incorporated herein by reference.

BACKGROUND

1. Technical Field

The present invention relates to an image capturing apparatus and a focusing control method.

2. Related Art

In recent years, as the resolution of the solid-state image capturing elements, such as the CCD (Charge Coupled Device) image sensor or the CMOS (Complementary Metal Oxide Semiconductor) image sensor is becoming more and more enhanced, demand for an information equipment having photographing function, such as, for example, a digital still camera, a digital video camera, a mobile phone such as a smart phone, or a PDA (Personal Digital Assistant, portable information terminal), is rapidly increasing. In the meantime, the information equipment having image capturing function described above is referred to as an image capturing apparatus.

In the image capturing apparatus, a contrast AF (Auto Focus, automatic focusing) method or a phase difference AF method (e.g., see Patent Literature 3 (WO2013-047160)) is adopted as a focusing control method which adjusts focus to a main subject. Each of the contrast AF method and the phase difference AF method has advantages and thus, an image capturing apparatus in which both of the contrast AF method and the phase difference AF method are equipped has been also proposed (e.g., see Patent Literature 1 (JP-A-2010-139942) and Patent Literature 2 (JP-A-2010-204294)).

It has been known that the phase difference AF method lacks credibility when a high frequency component is included in an image of a subject. Accordingly, whether a periodic pattern is present in the image of the subject is determined from a frequency analysis of normal pixels, and a focusing control is performed using a contrast AF method when the periodic pattern is present in the image of the subject in Patent Literature 2.

When the credibility of the phase difference AF method is determined using detection signals of the normal pixels as disclosed in Patent Literature 2, a time is needed for the determination and thus, a time required to adjust the focus to the main subject becomes longer.

SUMMARY OF INVENTION

An illustrative aspect of the present invention is to provide an image capturing apparatus that may determine the credibility of a phase difference AF method at high speed.

[1] According to an aspect of the present invention, it is an image capturing apparatus, comprising: an image capturing element configured to capture an image of a subject through an image capturing optical system, wherein the image capturing element comprises signal detection units having first signal detection units and second signal detection units, each of the first signal detection units is configured to detect a signal according to one of a pair of light fluxes, said one and the other of the pair of light fluxes having passed through different portions of a pupil area of the image capturing optical system, and each of the second signal detection units is configured to detect a signal according to the other of the pair of light fluxes; a focusing control unit configured to perform a focusing control of the image capturing optical system by a phase difference AF method using the detection signals of the first signal detection units and the second signal detection units; a matching degree generation unit configured to generate a first matching degree which corresponds to a matching degree of two images captured by a first pair using the detection signals of the respective signal detection units of the first pair, wherein the first pair is a pair of a first signal detection unit group of a plurality of the first signal detection units parallel in a phase difference detection direction by the first signal detection unit and the second signal detection unit and a signal detection unit group of the second signal detection units arranged to be spaced apart by a same distance in one direction with respect to the respective signal detection units of the first signal detection unit group, and a second matching degree which corresponds to a matching degree of two images captured by a second pair using the detection signals of the respective signal detection units of the second pair, wherein the second pair is a pair of a second signal detection unit group of a plurality of the first signal detection units arranged to be spaced apart by a same distance in a same direction with respect to the respective signal detection units of the first signal detection unit group and parallel in the phase difference detection direction and a signal detection unit group of the second signal detection units arranged to be spaced apart by a same distance in another direction different from the one direction with respect to the respective signal detection units of the second signal detection unit group; and a credibility determination unit configured to determine credibility of the focusing control by the phase difference AF method using the detection signals of the respective signal detection units of each of the first pair and the second pair based on the first matching degree and the second matching degree.

[2] According to another aspect of the present invention, it is a focusing control method performed by an image capturing apparatus including an image capturing element configured to capture an image of a subject through an image capturing optical system, wherein the image capturing element comprises signal detection units having first signal detection units and second signal detection units, each of the first signal detection units is configured to detect a signal according to one of a pair of light fluxes, said one and the other of the pair of light fluxes having passed through different portions of a pupil area of the image capturing optical system, and each of the second signal detection units is configured to detect a signal according to the other of the pair of light fluxes, wherein the focusing control method comprising: a focusing control step of performing a focusing control of the image capturing optical system by a phase difference AF method using the detection signals of the first signal detection units and the second signal detection units; a matching degree generation step of generating a first matching degree which corresponds to a matching degree of two images captured by a first pair using the detection signals of the respective signal detection units of the first pair, wherein the first pairs is a pair of a first signal detection unit group of a plurality of the first signal detection units parallel in a phase difference detection direction by the first signal detection unit and the second signal detection unit and a signal detection unit group of the second signal detection units arranged to be spaced apart by a same distance in one direction with respect to the respective signal detection units of the first signal detection unit group, and a second matching degree which corresponds to a matching degree of two images captured by a second pair using the detection signals of the respective signal detection units of the second pair, wherein the second pairs is a pair of a second signal detection unit group of a plurality of the first signal detection units arranged to be spaced apart by a same distance in a same direction with respect to the respective signal detection units of the first signal detection unit group and parallel in the phase difference detection direction and a signal detection unit group of the second signal detection units arranged to be spaced apart by a same distance in another direction different from the one direction with respect to the respective signal detection units of the second signal detection unit group; and a credibility determination step of determining credibility of the focusing control by the phase difference AF method using the detection signals of the respective signal detection units of each of the first pair and the second pair based on the first matching degree and the second matching degree.

With any one of [1] and [2], it is possible to provide an image capturing apparatus and a focusing control method that may determine the credibility of a phase difference AF method at high speed.

DESCRIPTION OF EMBODIMENTS

Hereinafter, an embodiment of the present invention will be described with reference to the drawings.

Figure 1:
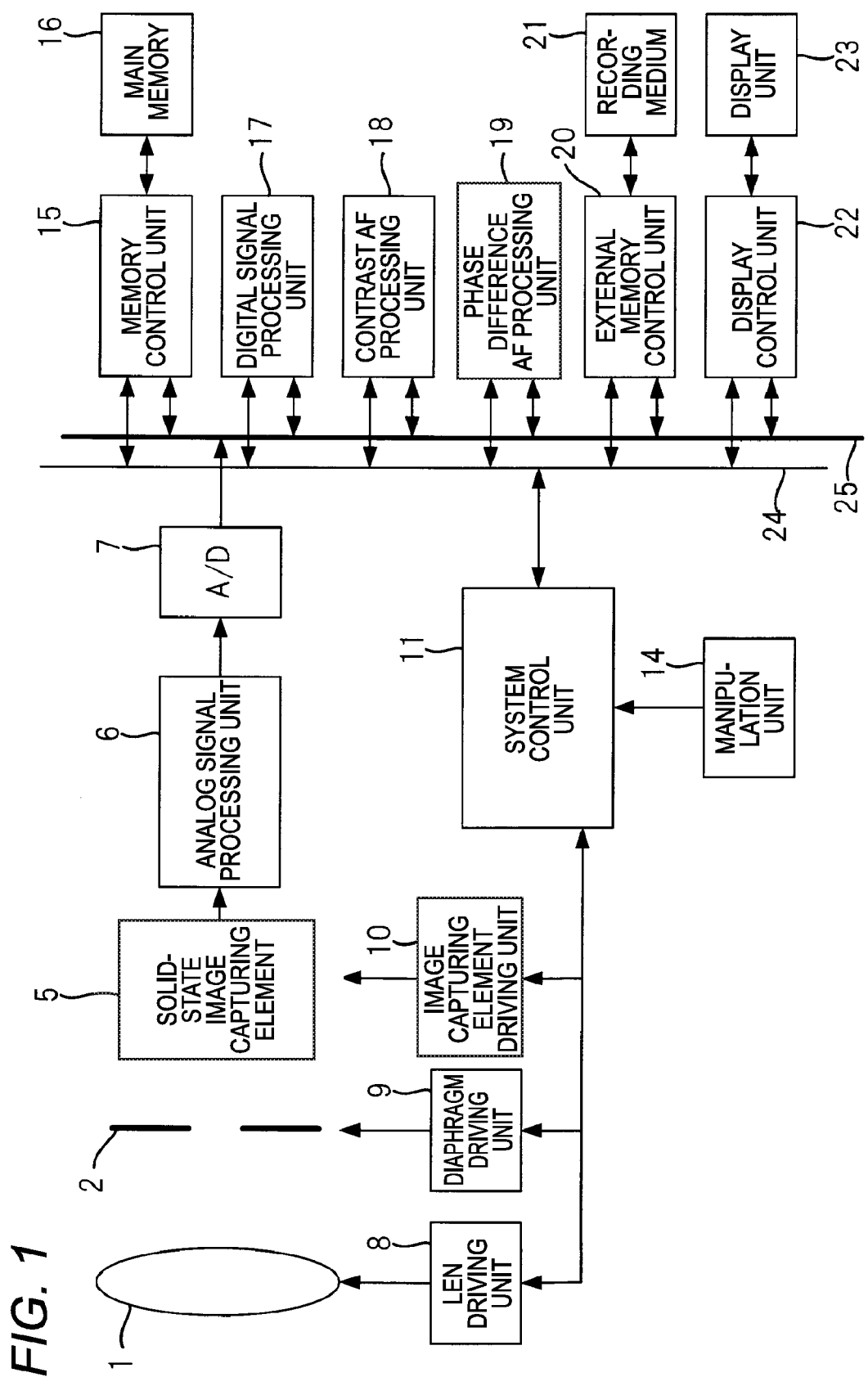
FIG. 1 is a schematic diagram illustrating a configuration of a digital camera as an example of an image capturing apparatus for explaining an embodiment of the present invention.

FIG. 1 is a schematic diagram illustrating a configuration of a digital camera as an example of an image capturing apparatus for explaining an embodiment of the present invention.

The digital camera illustrated in FIG. 1 includes a photographing lens 1 which includes a focus lens and a zoom lens, and a lens device having a diaphragm 2. The lens device constitutes an image capturing optical system. The lens device may be detachable to or fixed to a camera main body. The photographing lens 1 is needed to just include at least the focus lens.

The camera main body includes a CCD type or a CMOS type solid-state image capturing element 5 which captures an image of a subject through the lens device, and an analog signal processing unit 6 connected to the output of the solid-state imaging device 5 and performs an analog signal processing such as a correlated double sampling, and an A/D conversion circuit 7 which converts an analog signal output from the analog signal processing unit 6 into a digital signal. The analog signal processing unit 6 and the A/D conversion circuit 7 are controlled by a system control unit 11. The analog signal processing unit 6 and the A/D conversion circuit 7 may be built in the solid-state image capturing element 5.

The system control unit 11 which comprehensively controls an overall operation of an electrical control system of the digital camera controls a lens driving unit 8 to adjust a position of the focus lens included in the photographing lens 1 or a position of the zoom lens included in the photographing lens 1. Further, the system control unit 11 controls the size of aperture of the diaphragm 2 through a diaphragm driving unit 9 to adjust an amount of exposure.

Further, the system control unit 11 drives the solid-state image capturing element 5 through an image capturing element driving unit 10 and outputs an image of the subject captured through the photographing lens 1 as a captured image signal. An instruction signal from a user is input to the system control unit 11 through a manipulation unit 14.

The system control unit 11, as will be described later, selects any one of a contrast AF processing unit 18 and a phase difference AF processing unit 19, and performs focusing control of the photographing lens 1 according to a focusing position determined by the selected processing unit.

Further, the electrical control system of the digital camera includes a main memory 16, a memory control unit 15 connected to the main memory 16, a digital signal processing unit 17 which performs, for example, interpolating operation, gamma correction operation and the RGB/YC conversion process, with respect to the captured image signal output from the A/D conversion circuit 7 to generate photographed image data, the contrast AF processing unit 18 which determines a focusing position using the contrast AF method, the phase difference AF processing unit 19 which determines a focusing position using the phase difference AF method, an external memory control unit 20 to which a detachable recording medium 21 is connected, and a display control unit 22 to which a display unit 23 mounted on such as a rear surface of the camera is connected.

The memory control unit 15, the digital signal processing unit 17, the contrast AF processing unit 18, the phase difference AF processing unit 19, the external memory control unit 20 and the display control unit 22 are connected with each other by a control bus 24 and a data bus 25, and controlled by instructions from the system control unit 11.

Figure 2:
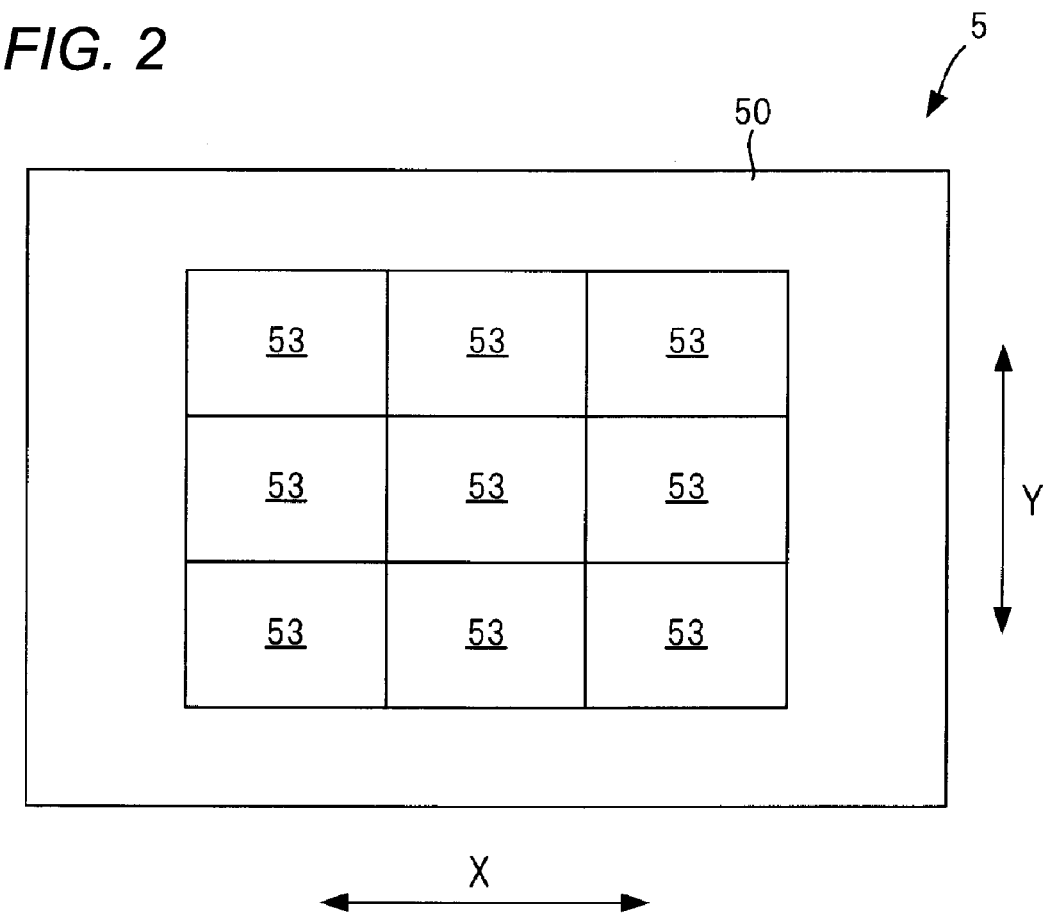
FIG. 2 is a plan view showing an entire configuration of a solid-state imaging device 5 mounted on the digital camera illustrated in 1.

FIG. 2 is a plan view showing an entire configuration of the solid-state imaging device 5 mounted on the digital camera illustrated in FIG. 1.

The solid-state image capturing element 5 includes a light receiving surface 50 in which a large number of pixels that are two-dimensionally arranged in the row direction X and the column direction Y perpendicular thereto are disposed. In the example of FIG. 2, for example, nine AF areas 53 are formed in the light receiving surface 50 and each AF area 53 corresponds to a target area for adjusting a focus thereto.

The AF area 53 includes image capturing pixels and phase difference detection pixels as pixels.

Only the image capturing pixels are arranged on a portion except for the AF area 53 in the light receiving surface 50. In the meantime, the AF area 53 may be formed on the light receiving surface 50 without a gap.

Figure 3:
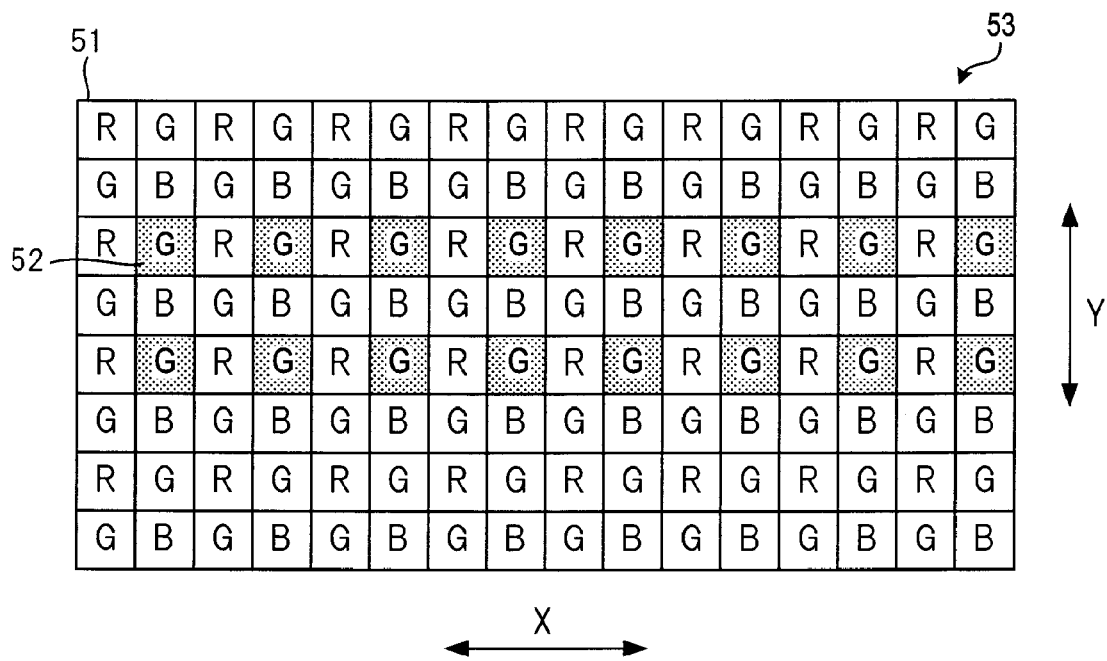
FIG. 3 is a partially enlarged view of an AF area 53 illustrated in FIG. 2.

FIG. 3 is a partially enlarged view of the AF area 53 illustrated in FIG. 2.

Pixels 51 are two-dimensionally arranged in the AF area 53. Each pixel 51 includes a photoelectric conversion unit such as a photodiode and a color filer formed above the photoelectric conversion unit.

In FIG. 3, the letter "R" is given to the pixel 51 (R pixel 51) which includes a color filter (R filter) transmitting red light, the letter "G" is given to the pixel 51 (G pixel 51) which includes a color filter (G filter) transmitting green light, and the letter "B" is given to the pixel 51 (B pixel 51) which includes a color filter (B filter) transmitting blue light. The color filters are arranged in a Bayer arrangement in the entirety of the light receiving surface 50.

In the AF area 53, some of G pixels 51 (the pixel 51 with halftone dot meshing in FIG. 3) are defined as the phase difference detection pixel 52. In the example of FIG. 3, each G pixel 51 in any pixel row of pixel rows that include R pixels 51 and G pixels 51, and another G pixel 51 which is nearest to the G pixel 51 among the same color pixels in the column direction (Y), are defined as the phase difference detection pixel 52.

Figure 4:
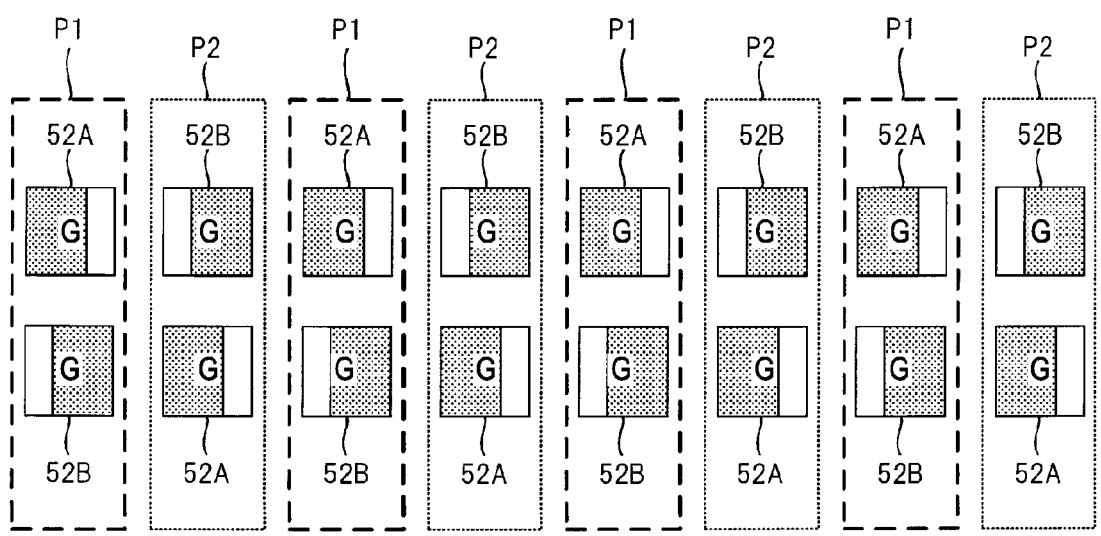
FIG. 4 is a view illustrating only a phase difference detection pixel 52 illustrated in FIG. 3.

FIG. 4 is a view illustrating only a phase difference detection pixel 52 illustrated in FIG. 3.

As illustrated in FIG. 4, the phase difference detection pixel 52 includes two types of phase difference detection pixel 52A and phase difference detection pixel 52B.

The phase difference detection pixel 52A is a signal detection unit that receives one of a pair of light fluxes having passed through other portion of the pupil area of the photographing lens 1 and detects a signal according to an amount of light received.

The phase difference detection pixel 52B is a signal detection unit that receives the other of the pair of light fluxes and detects a signal according to an amount of light received.

In the meantime, a plurality of pixels 51 other than the phase difference detection pixels 52A and 52B are the image capturing pixel in the AF area 53, and the image capturing pixel receives the pair of light fluxes having passed through the photographing lens 1 and detects a signal according to an amount of light received.

A light shielding film is provided above the photoelectric conversion unit of each pixel 51 and an opening which defines a light receiving area of the photoelectric conversion unit is formed on the light shielding film.

The center of the opening of the image capturing pixel 51 is coincident with the center of the photoelectric conversion unit of the image capturing pixel 51. In contrast, the center of the opening (white portion in FIG. 4) of the phase difference detection pixel 52A is eccentric to the right relative to the center of the photoelectric conversion unit of the phase difference detection pixel 52A. Further, the center of the opening (white portion in FIG. 4) of phase difference detection pixel 52B is eccentric to the left with relative to the center of the photoelectric conversion unit of the phase difference detection pixel 52B.

With this configuration, a phase difference of images captured by each of a pixel group and another pixel group in a row direction (X) may be detected by a pixel group of the phase difference detection pixels 52A that are present in any row and another pixel group of the phase difference detection pixels 52B, each of which is arranged to be adjacent to the corresponding phase difference detection pixel 52A of the pixel group by being spaced apart by the same distance in one direction.

As illustrated in FIG. 4, at least one pair line is formed in the AF area 53. In the pair line, pixel pairs P1 and pixel pairs P2 are alternately arranged in the row direction (X). The pixel pair P1 is a pair of the phase difference detection pixel 52A and the phase difference detection pixel 52B arranged to be spaced apart by a predetermined distance in a direction orthogonal to a phase difference detection (row direction (X)) with respect to the phase difference detection pixel 52A. The pixel pair P2 is a pair has a positional relationship between the phase difference detection pixel 52A and the phase difference detection pixel 52B being reversed in the pixel pair P1.

It may be referred to that the pair line is configured by a first pair and a second pair. The first pair is formed of a first signal detection unit group (phase difference detection pixels 52A of all the pixel pairs P1) of a plurality of the phase difference detection pixels 52A parallel in the phase difference detection direction and a signal detection unit group (phase difference detection pixels 52B of all the pixel pairs P1) of the phase difference detection pixels 52B arranged to be spaced apart by the same distance (one pixel distance) in one direction (downward direction) with respect to the respective phase difference detection pixels 52A of the first signal detection unit group. The second pair is formed of a second signal detection unit group (phase difference detection pixels 52A of all the pixel pairs P2) of a plurality of the phase difference detection pixels 52A arranged to be spaced apart by the same distance in the same direction (obliquely rightward and downward direction) and parallel in the detection direction with respect to the respective phase difference detection pixels 52A of the first signal detection unit group and another signal detection unit group (phase difference detection pixels 52B of all the pixel pairs P2) of the phase difference detection pixels 52B arranged to be spaced apart by the same distance (one pixel distance) in upward direction which is different from the downward direction with respect to the respective phase difference detection pixels 52A of the second signal detection unit group.

The phase difference AF processing unit 19 illustrated in FIG. 1 calculates a phase difference amount which corresponds to a relative position deviation amount of two images formed by the pair of light fluxes using the detection signal group read from the phase difference detection pixels 52A and the phase difference detection pixels 52B that are present in one AF area 53 selected by, for example, user manipulation, among nine AF areas 53.

Also, the phase difference AF processing unit 19 obtains a focus adjustment amount of the photographing lens 1 based on the phase difference amount, here, a deviation amount and a deviation direction from the focused state, that is, an amount of defocus. The phase difference AF processing unit 19 determines a focusing position of the focus lens from the amount of defocus. The phase difference AF processing unit 19 and the system control unit 11 serves as a focusing control unit which performs a focusing control of the image capturing optical system by the phase difference AF method using the detection signals of the phase difference detection pixels 52A and the phase difference detection pixels 52B.

The contrast AF processing unit 18 illustrated in FIG. 1 analyzes an image captured by one AF area 53 selected by, for example, the user manipulation, among nine AF areas 53 to determine the focusing position of the photographing lens 1 using a well-known contrast AF method.

That is, the contrast AF processing unit 18 obtains a contrast (brightness difference) of image obtained for each of moved positions (plural positions) while moving the focus lens position of the photographing lens 1 by the control of the system control unit 11. Also, the focus lens position at which the contrast becomes the maximum value is determined as the focusing position.

In the meantime, the AF area 53 may be selected in such a manner that either one AF area 53 is selected or plural AF areas 53 disposed continuously and in parallel are selected.

When an instruction to perform AF is issued, the system control unit 11 of the digital camera of the present embodiment performs the focusing control by the phase difference AF method or the focusing control by the contrast AF method. In this case, the system control unit 11 determines as to which method is to be used to perform the focusing control to perform the focusing control with an optimum method. Hereinafter, operations of the digital camera after issuance of an AF instruction will be described.

Figure 5:
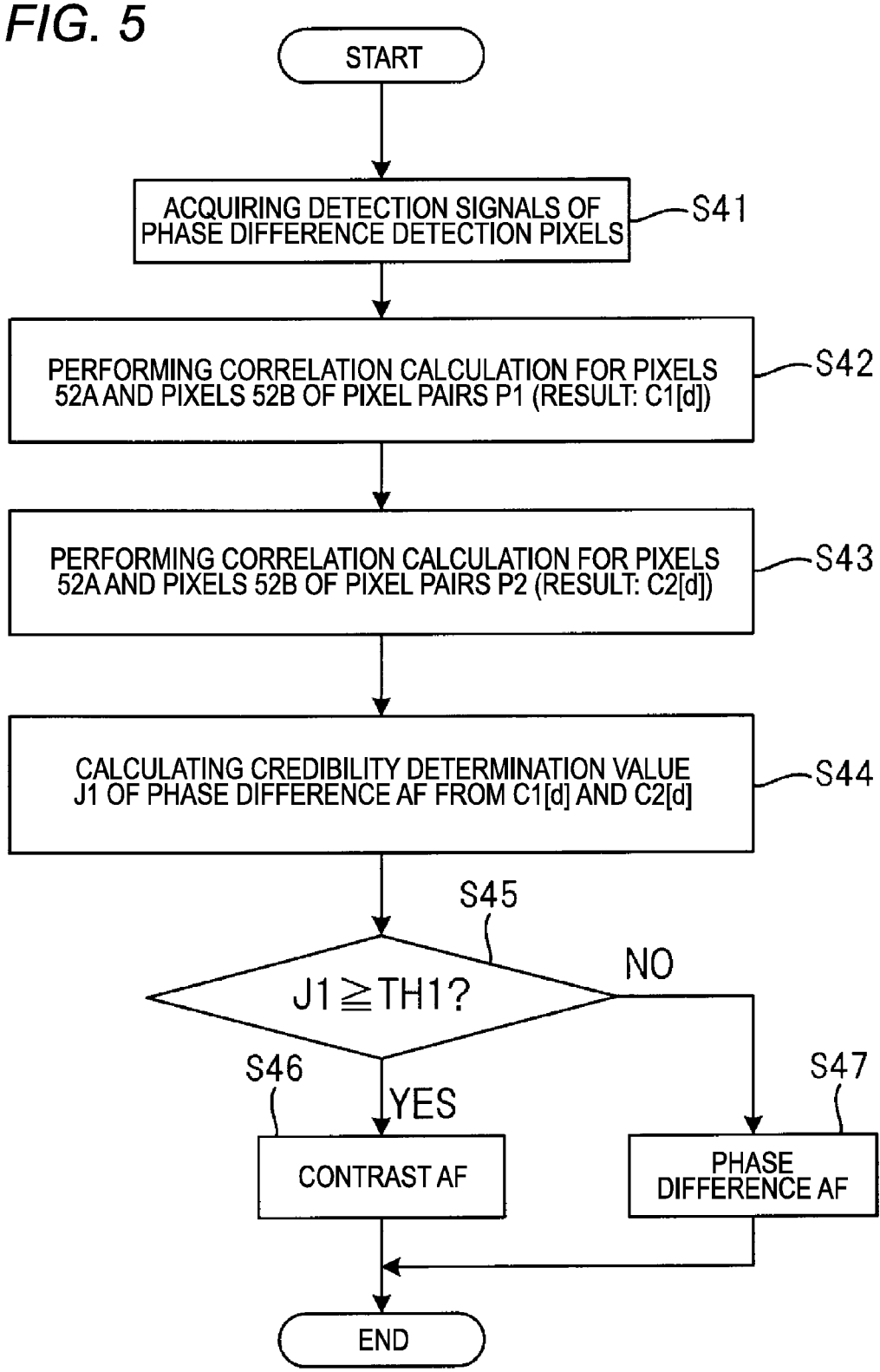
FIG. 5 is a flowchart for explaining AF operations of the digital camera illustrated in FIG. 1.

FIG. 5 is a flowchart for explaining AF operations of the digital camera illustrated in FIG. 1.

When an AF instruction is issued, first, the phase difference AF processing unit 19 acquires detection signals of the phase difference detection pixel 52A and the phase difference detection pixel 52B present in the selected AF area 53 (step S41).

Subsequently, the phase difference AF processing unit 19 performs correlation calculation between a group of detection signals of the phase difference detection pixels 52A and a group of detection signals of the phase difference detection pixels 52B of the pixel pairs P1 which constitute one pair line among the acquired detection signals (step S42).

Specifically, an area C[d] surrounded by two data waveforms obtained by the following equation when data of one detection signal group are denoted by A[1] . . . A[k] and data of another detection signal group are denoted by B[1] . . . B[k] and two data A[1] . . . A[k] and B[1] . . . B[k] are shifted by a shift amount "d" is obtained.

[Equation 1]

$$C[d] = \sum_{n=1}^{k} (A[n+d] - B[n])^2 \quad (1)$$

$$d = -L, \ldots, -2, -1, 0, 1, 2, \ldots, L$$

In the following, a correlation calculation result at step S42 is denoted by C1[d]. The correlation calculation result C1[d] becomes a value indicating a matching degree of images captured by each of the phase difference detection pixels 52A and the phase difference detection pixels 52B of the pixel pairs P1.

Subsequently, the phase difference AF processing unit 19 performs the correlation calculation between a group of detection signals of the phase difference detection pixels 52A and a group of detection signals of the phase difference detection pixels 52B of the pixel pairs P2 which constitutes one pair line among the acquired detection signals (step S43).

The correlation calculation result is denoted by C2[d]. The correlation calculation result C2[d] becomes a value indicating a matching degree of images captured by each of the phase difference detection pixels 52A and the phase difference detection pixels 52B of the pixel pairs P2.

Subsequently, the phase difference AF processing unit 19 generates a credibility determination value J1 for determining credibility of the focusing control by the phase difference AF method using the detection signals of the phase difference detection pixels 52A and the phase difference detection pixels 52B included in one pair line described above using the correlation calculation result C1[d] and the correlation calculation result C2[d] (step S44).

In a case where a spatial frequency of a subject imaged on the pair line is low, a shape of graph for the C1[d] is almost identical to that for the C2[d] when the shift amount "d" is set on the horizontal axis and C[d] is set on the vertical axis. However, when the spatial frequency of the subject imaged on the pair line is high, the shape of graph for the C1[d] is largely different from that for the C2[d].

As such, although it is an area on which the same subject is imaged, when the correlation calculation results for two pixel pairs P1 and P2 present on the area are different from each other, it may be determined that a possibility of erroneous correlation calculation result is high and credibility of the focusing position determined using the detection signal of the phase difference detection pixel of the pair line is low.

Therefore, the phase difference AF processing unit 19 compares the shape of the graph based on the C1[d] with that based on the C2[d] to generate the credibility determination value J1.

Specifically, the credibility determination value J1 is generated by calculating the following Equation 2.

[Equation 2]

$$J1 = \frac{\sum_{d=-L}^{L} |C1[d] - C2[d]|}{\sum_{d=-L}^{L} C1[d] + \sum_{d=-L}^{L} C2[d]} \quad (2)$$

When the shape of the graph based on the C1[d] is similar to that based on the C2[d], numerator of Equation 2 becomes a small value, and when the two shapes are different from each other, numerator of Equation 2 becomes a large value.

Accordingly, after the credibility determination value J1 is generated at step S44, the system control unit 11 compares the credibility determination value J1 and a threshold value TH1 set in advance, and when it is determined that the value J1 is equal to or larger than the threshold value TH1 ("YES" at step S45), the system control unit 11 determines that credibility of the focusing control by the phase difference AF method is low. Further, when it is determined that the value J1 is less than the threshold value TH1 ("NO" at step S45), the system control unit 11 determines that credibility of the focusing control by the phase difference AF method is high.

When it is determined that credibility of the focusing control by the phase difference AF method is low ("YES" at step S45), the system control unit 11 selects the contrast AF processing unit 18 and causes the contrast AF processing unit 18 to determine the focusing position. Also, the system control unit 11 performs the focusing control of the photographing lens 1 according to the determined focusing position (step S46).

When it is determined that credibility of the focusing control by the phase difference AF method is high ("NO" at step S45), the system control unit 11 selects the phase difference AF processing unit 19 and causes the phase difference AF processing unit 19 to determine the focusing position. Also, the system control unit 11 performs the focusing control of the photographing lens 1 according to the determined focusing position (step S47).

In the meantime, when a plurality of pair lines are present in the selected AF area 53, the phase difference AF processing unit 19 performs processes of steps S42 to S44 for each pair line to generate the credibility determination value J1.

Also, when at least one pair line in which the credibility determination value J1 is less than the threshold value TH1 are present among the plurality of pair lines, the system control unit 11 determines that the credibility of the focusing control by the phase difference AF method for the selected AF area 53 is high. Also, at step S47, the system control unit 11 determines the focusing position using the detection signal read from the pair line in which the credibility determination value J1 is less than the threshold value TH1.

That is, the system control unit 11 performs the focusing control by the phase difference AF method using the detection signal of the phase difference detection pixel present in the pair line except for the pair line in which it was determined that the credibility is low.

Here, in a case where a plurality of pair lines in which the respective credibility determination values J1 are less than the threshold value TH1 are present, the phase difference AF processing unit 19 determines the focusing position based on an average of the defocus amount calculated for, for example, each pair line.

Further, when the pair line in which the credibility determination value J1 is less than the threshold value TH1 is not present among the plurality of pair lines, the system control unit 11 determines that the credibility of the focusing control by the phase difference AF method for the selected AF area 53 is low.

As described above, according to the digital camera illustrated in FIG. 1, the credibility of the focusing control by the phase difference AF method may be determined using only the detection signals of the phase difference detection pixels 52A and 52B and thus, a credibility determination may be performed at high speed. Further, reading of the detection signal of the image capturing pixel may be omitted at the time of the determination of credibility and thus, power consumption may be reduced.

Further, according to the digital camera illustrated in FIG. 1, at step S47, the phase difference AF processing unit 19 may determine the focusing position using the correlation calculation results C1[d] and C2[d] obtained previously and thus, the phase difference AF may be performed at high speed.

In the meantime, as the focusing position determination method at step S47, for example, a method in which the amount of defocus is determined based on the correlation calculation result C1[d] and the focusing position is determined according to the determined defocus amount, a method in which the amount of defocus is determined based on the correlation calculation result C2[d] and the focusing position is determined according to the determined defocus amount, or a method in which the focusing position is determined according to, for example, an average of the two determined defocus amount, may be adopted.

Figure 6:
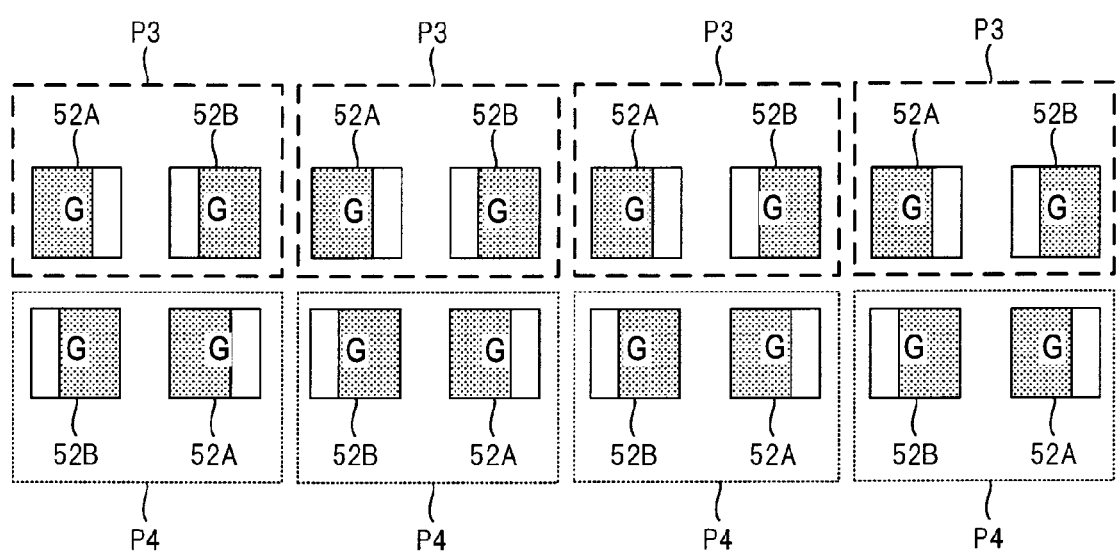
FIG. 6 is a view illustrating a modified example of pixel pairs set in the pair line.

Heretofore, the pair line present in the AF area 53 is described as a line of the pixel pairs P1 and the pixel pairs P2, but as illustrated in FIG. 6, the pair line may be referred to as a line of pixel pairs P3 and pixel pairs P4.

That is, the pair line may be regarded as a combination of a line of the pixel pairs P3 and a line of the pixel pairs P4. In the pixel pair P3, the phase difference detection pixel 52A and the phase difference detection pixel 52B disposed to be adjacent to the phase difference detection pixel 52A by being spaced apart by a predetermined distance in the phase difference detection direction (row direction X), are arranged in the row direction X. In the pixel pair P4, the phase difference detection pixel 52A and the phase difference detection pixel 52B are arranged in the row direction X with having a positional relationship between the phase difference detection pixel 52A and the phase difference detection pixel 52B in the pixel pair P3 is reversed.

When the pixel pairs P3 and P4 are set in the pair line as illustrated in FIG. 6, the phase difference AF processing unit 19 performs the correlation calculation between a group of detection signals of the phase difference detection pixels 52A and a group of detection signals of the phase difference detection pixels 52B of the pixel pairs P3 at step S42 of FIG. 5, and the correlation calculation between a group of detection signals of the phase difference detection pixels 52A and a group of detection signals of the phase difference detection pixels 52B of the pixel pairs P4 at step S43 of FIG. 5. Also, the credibility determination value J1 is generated based on the two correlation calculation results at step S44.

Accordingly, it is possible to perform the credibility determination of the focusing control by the phase difference AF method using only the detection signal of the phase difference detection pixel.

As illustrated in FIG. 4 and FIG. 6, even for the same pair line, a credibility determination value may be generated in two patterns of one pattern where the pixel pairs P1 and P2 are set and the other pattern where the pixel pairs P3 and P4 are set.

In the above description, a determination as to whether the phase difference AF is performed is made based on the credibility determination value generated in any of the two patterns. In contrast, a determination as to whether the phase difference AF is performed may be made based on the credibility determination value generated in each of the two patterns. Hereinafter, descriptions will be made with reference to the flowchart.

Figure 7:
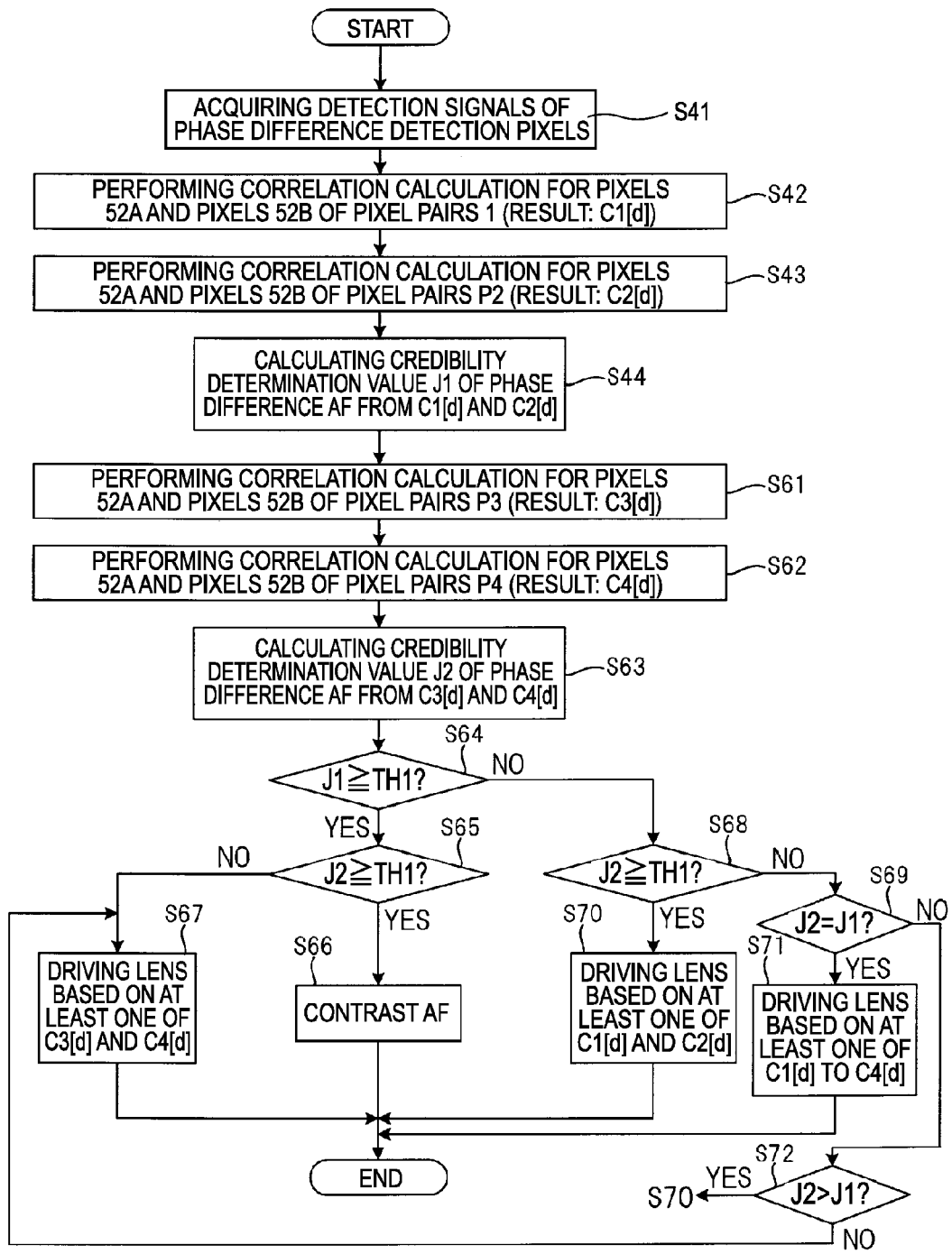
FIG. 7 is a flowchart for explaining a modified example of AF operations of the digital camera illustrated in FIG. 1.

FIG. 7 is a flowchart for explaining a modified example of AF operations of the digital camera illustrated in FIG. 1. In FIG. 7, similar reference numerals are given to the same processes as those illustrated in FIG. 4, and descriptions thereof are omitted.

After generating the credibility determination value J1 at step S44, the phase difference AF processing unit 19 performs the correlation calculation between a group of detection signals of the phase difference detection pixels 52A and a group of detection signals of the phase difference detection pixels 52B of the pixel pairs P3 constituting the pair line among the detection signals acquired at step S41 (step S61).

The correlation calculation result is denoted by C3[d]. The correlation calculation result C3[d] becomes a value indicating a matching degree of images captured by each of the phase difference detection pixels 52A and the phase difference detection pixels 52B of the pixel pairs P3.

Subsequently, the phase difference AF processing unit 19 performs correlation calculation between a group of detection signals of the phase difference detection pixels 52A and a group of detection signals of the phase difference detection pixels 52B of the pixel pairs P4 constituting the pair line among the detection signals acquired at step S41 (step S62). The correlation calculation result is denoted by C4[d].

The correlation calculation result C4[d] becomes a value indicating a matching degree of images captured by each of the phase difference detection pixel 52A and the phase difference detection pixel 52B of the pixel pair P4.

Subsequently, the phase difference AF processing unit 19 generates a credibility determination value J2 for determining the credibility of the focusing control by the phase difference AF method using the detection signals of the phase difference detection pixels 52A and the phase difference detection pixels 52B included in one pair line described above using the correlation calculation result C3[d] and the correlation calculation result C4[d] (step S63).

Specifically, the phase difference AF processing unit 19 generates the credibility determination value J2 by calculating the following equation 3.

[Equation 3]

$$J2 = \frac{\sum_{d=-L}^{L} |C3[d] - C4[d]|}{\sum_{d=-L}^{L} C3[d] + \sum_{d=-L}^{L} C4[d]} \quad (3)$$

Figure 8:
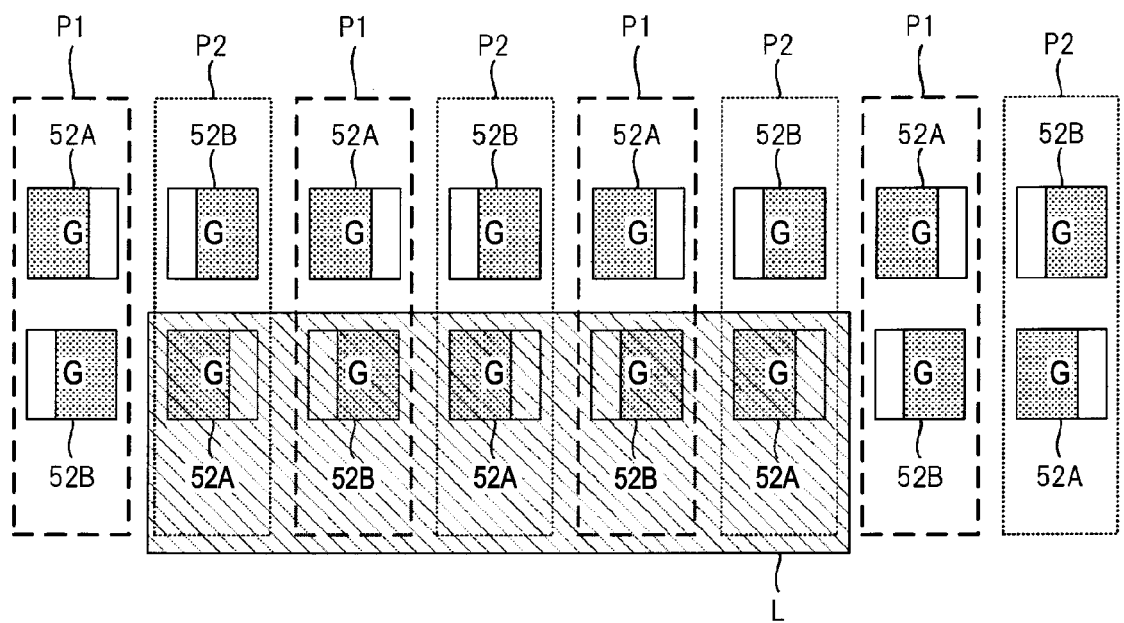
FIG. 8 is a view illustrating an example of a straight line L extending in a phase difference detection direction.

For example, as illustrated in FIG. 8, it is assumed that a straight line L extending in the phase difference detection direction is imaged on a portion of the pair line. In this case, a matching degree (C1[d]) of two images captured by the phase difference detection pixels 52A and 52B of the pixel pairs P1 is substantially close to a matching degree (C2[d]) of two images captured by the phase difference detection pixels 52A and 52B of the pixel pairs P2 and thus, the credibility determination value J1 becomes a small value.

In the meantime, a matching degree (C3[d]) of two images captured by the phase difference detection pixels 52A and 52B of the pixel pairs P3 is largely different from a matching degree (C4[d]) of two images captured by the phase difference detection pixels 52A and 52B of the pixel pairs P4 and thus, the credibility determination value J1 becomes a large value.

Accordingly, in this case, when the focusing position is determined using at least one of the correlation calculation results C1[d] and C2[d], it becomes possible to perform a phase difference AF with high credibility.

Accordingly, after step S63, the system control unit 11 determines as to whether the focusing control is to be performed by the phase difference AF method or the focusing control is performed by the contrast AF method based on the credibility determination value J1 and the credibility determination value J2.

Specifically, when it is determined that J1≥TH1 ("YES" at step S64) and J2≥TH1 ("YES" at step S65), the system control unit 11 determines that neither the credibility of the focusing position determined using at least one of the correlation calculation result C1[d] and the correlation calculation result C2[d] nor the credibility of the focusing position determined using at least one of the correlation calculation result C3[d] and the correlation calculation result C4[d] is high, and selects the contrast AF processing unit 18 to perform the focusing control (step S66).

When it is determined that J1≥TH1 ("YES" at step S64) and J2<TH1 ("NO" at step S65), the system control unit 11 determines that credibility of the focusing position determined using at least one of the correlation calculation result C3[d] and the correlation calculation result C4[d] is high, and selects the phase difference AF processing unit 19.

Also, the system control unit 11 causes the phase difference AF processing unit 19 to determine the focusing position based on at least one of the correlation calculation results C3[d] and C4[d], and moves the focus lens to the determined focusing position (step S67).

When it is determined that J1<TH1 ("NO" at step S64) and J2≥TH1 ("YES" at step S68), the system control unit 11 determines that credibility of the focusing position determined using at least one of the correlation calculation result C1[d] and the correlation calculation result C2[d] is high, and selects the phase difference AF processing unit 19.

Also, the system control unit 11 causes the phase difference AF processing unit 19 to determine the focusing position based on at least one of the correlation calculation results C1[d] and C2[d], and moves the focus lens to the determined focusing position (step S70).

When it is determined that J1<TH1 ("NO" at step S64) and J2<TH1 ("NO" at step S68) and further, J2=J1 ("YES" at step S69), the system control unit 11 determines that the credibility of the focusing position determined using at least one of the correlation calculation results C1[d] to C4[d] is high, and selects the phase difference AF processing unit 19.

Also, the system control unit 11 causes the phase difference AF processing unit 19 to determine the focusing position based on at least one of the correlation calculation results C1[d] to C4[d], and moves the focus lens to the determined focusing position (step S71).

When it is determined that J1<TH1 ("NO" at step S64) and J2<TH1 ("NO" at step S68) and further, J2≠J1 ("NO" at step S69), the system control unit 11 compares the credibility determination values J1 and J2 at step S72.

When the comparison result is J2>J1 at step S72, credibility of the phase difference AF determined using at least one of the correlation calculation result C1[d] and the correlation calculation result C2[d] is high, and thus, the process of step S70 is performed.

In the meantime, when the comparison result is J2<J1, credibility of the phase difference AF determined using at least one of the correlation calculation result C3[d] and the correlation calculation result C4[d] is high, and thus, the process of step S67 is performed.

As described above, according to the exemplary operations of FIG. 7, even in a case where credibility determined based only on one credibility determination value is low, when credibility determined based on the other credibility determination value is high, the focusing control by the phase difference AF method is performed. Therefore, compared to the example of operations of FIG. 4, a possibility that the phase difference AF method is adopted may be increased and thus, it becomes possible to perform AF at high speed.

Further, when two credibility determination values are different from each other and less than the threshold value TH1, the focusing position may be determined based on the correlation calculation result with which the credibility determination value becomes smaller and thus, determination accuracy of the focusing position may be increased.

When two credibility determination values are the same value and less than the threshold value TH1, the focusing position may be determined using four correlation calculation results at maximum at the process of step S71 of FIG. 7 and thus, the determination accuracy of the focusing position may be increased.

Heretofore, a correlation calculation result has been used as a matching degree of two images captured by each of two pixel pairs constituting the pair line. Information other than the correlation calculation result may be used as the matching degree.

Specifically, the phase difference AF processing unit 19 generates a ratio of an integrated value of the detection signals of the phase difference detection pixels 52A and an integrated value of the detection signals of the phase difference detection pixels 52B output from all the pixel pairs P1 constituting the pair line as a matching degree of two images captured by all the pixel pairs P1.

Similarly, the phase difference AF processing unit 19 generates a ratio of an integrated value of the detection signals of the phase difference detection pixels 52A and an integrated value of the detection signals of the phase difference detection pixels 52B output from all the pixel pairs P2 constituting the pair line as the matching degree of two images captured by all the pixel pairs P2.

When the spatial frequency of the subject imaged on the pair line is low, the integrated value of the detection signals of the phase difference detection pixels 52A of all the pixel pairs P1 and the integrated value of the detection signals of the phase difference detection pixels 52B of all the pixel pairs P1 have almost the same value when a difference due to a phase difference between an image captured by the phase difference detection pixels 52A and an image captured by the phase difference detection pixels 52B, is excluded.

Further, the integrated value of the detection signals of the phase difference detection pixels 52A of all the pixel pairs P2 and the integrated value of the detection signals of the phase difference detection pixels 52B of all the pixel pairs P2 have almost the same value when a difference due to the phase difference is excluded.

In the meantime, as illustrated in FIG. 8, when a portion of the subject in which a straight line L is included is imaged on the pair line, the integrated value of the detection signals of the phase difference detection pixels 52A of all the pixel pairs P1 and the integrated value of the detection signals of the phase difference detection pixels 52B of all the pixel pairs P1 become largely different values from each other even when the difference due to the phase difference is excluded.

Further, the integrated value of the detection signals of the phase difference detection pixels 52A of all the pixel pairs P2 and the integrated value of the detection signals of the phase difference detection pixels 52B of all the pixel pairs P2 become largely different values from each other even when the difference due to the phase difference is excluded.

As described above, it is difficult to determine whether the difference in the integrated values is caused by either the phase difference or the subject of which image has high frequency component when only comparing the integrated value of the phase difference detection pixels 52A with the integrated value of the phase difference detection pixels 52B that belong to the same pixel pairs.

A phase difference is similarly generated in a captured image in any of the pixel pairs P1 and the pixel pairs P2. For this reason, a ratio of the integrated value of the detection signals of the phase difference detection pixels 52A and of the integrated value of the detection signals of the phase difference detection pixels 52B in the pixel pairs P2 may be subtracted from a ratio of the integrated value of the detection signals of the phase difference detection pixels 52A and of the integrated value of the detection signals of the phase difference detection pixels 52B in the pixel pairs P1 to cancel out a difference in the integrated values due to the phase difference. When the difference in the integrated values due to the phase difference may be cancelled out, it is possible to determine whether the straight line L as illustrated in FIG. 8 is present.

Therefore, the phase difference AF processing unit 19 generates a credibility determination value J3 for determining the credibility of the focusing control by the phase difference AF method using the detection signals of the phase difference detection pixels 52A and the phase difference detection pixels 52B included in the pair line by the following equation 4.

[Equation 4]

$$J3 = \left| \frac{\sum P1A}{\sum P1B} - \frac{\sum P2A}{\sum P2B} \right| \quad (4)$$

In Equation 4, ΣP1A indicates the integrated value of the detection signals of the phase difference detection pixels 52A that belong to all the pixel pairs P1 present in the pair line.

ΣP1B indicates the integrated value of the detection signals of the phase difference detection pixels 52B that belong to all the pixel pairs P1 present in the pair line.

ΣP2A indicates the integrated value of the detection signals of the phase difference detection pixels 52A that belong to all the pixel pairs P2 present in the pair line.

ΣP2B indicates the integrated value of the detection signals of the phase difference detection pixels 52B that belong to all the pixel pairs P2 present in the pair line.

When the value of the credibility determination value J3 is large, it may be determined that the straight line L exists as illustrated in FIG. 8. When the straight line L exists, it is difficult to accurately calculate the amount of defocus by the correlation calculation between the detection signals of the phase difference detection pixels 52A and the detection signals of the phase difference detection pixels 52B.

Accordingly, the system control unit 11 compares the value of J3 with the threshold value TH2 set in advance. When the comparison result is J3≥TH2, the system control unit 11 determines that credibility of the phase difference AF is low, and when the comparison result is J3<TH2, the system control unit 11 determines that the credibility of the phase difference AF is high.

Figure 9:
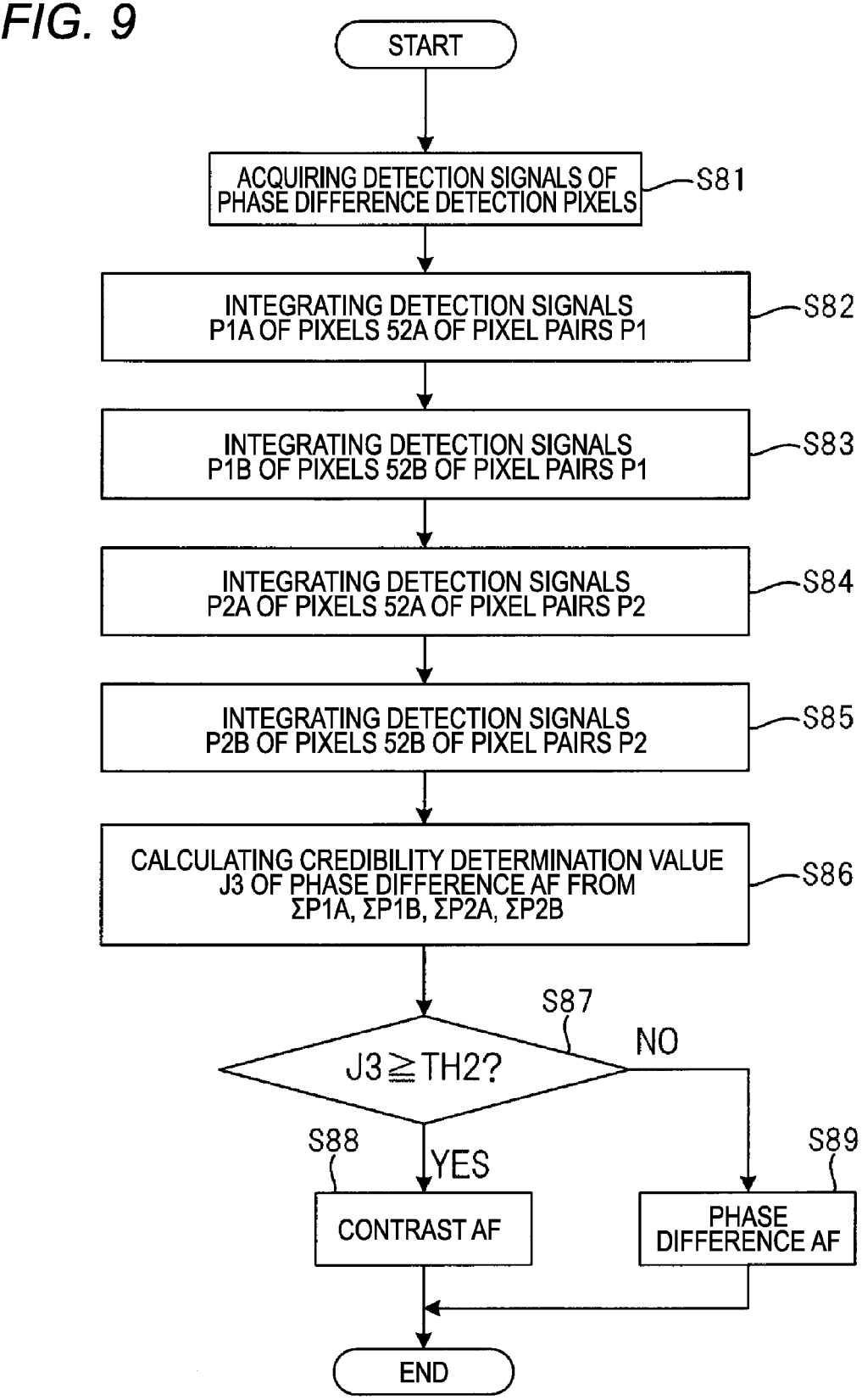
FIG. 9 is a flowchart for explaining another modified example of AF operations of the digital camera illustrated in FIG. 1.

FIG. 9 is a flowchart for explaining another modified example of AF operations of the digital camera illustrated in FIG. 1.

When an AF instruction is issued, first, the phase difference AF processing unit 19 acquires detection signals of the phase difference detection pixels 52A and the phase difference detection pixels 52B present in the selected AF area 53 (step S81).

Subsequently, the phase difference AF processing unit 19 integrates output signals of the phase difference detection pixels 52A of the pixel pairs P1 constituting one pair line among the acquired detection signals to obtain the integrated value ΣP1A (step S82).

Subsequently, the phase difference AF processing unit 19 integrates output signals of the phase difference detection pixels 52B of the pixel pairs P1 constituting one pair line among the acquired detection signals to obtain the integrated value ΣP1B (step S83).

Subsequently, the phase difference AF processing unit 19 integrates output signals of the phase difference detection pixels 52A of the pixel pairs P2 constitutes one pair line among the acquired detection signals to obtain the integrated value ΣP2A (step S84).

Subsequently, the phase difference AF processing unit 19 integrates output signals of the phase difference detection pixels 52B of the pixel pairs P2 constituting one pair line among the acquired detection signals to obtain the integrated value ΣP2B (step S85).

Subsequently, the phase difference AF processing unit 19 generates the credibility determination value J3 by calculating the equation 4 based on the ΣP1A, ΣP1B, ΣP2A and ΣP2B (step S86).

After the credibility determination value J3 is generated at step S86, the system control unit 11 compares the credibility determination value J3 and the threshold value TH2. When it is determined that J3≥TH2 ("YES" at step S87), the system control unit 11 determines that credibility of the focusing control by the phase difference AF method is low. Also, the system control unit 11 selects the contrast AF processing unit 18, and causes the contrast AF processing unit 18 to determine the focusing position and performs the focusing control of the photographing lens 1 according to the determined focusing position (step S88).

When it is determined that J3<TH2 ("NO" at step S87), the system control unit 11 determines that credibility of the focusing control by the phase difference AF method is high.

Also, the system control unit 11 selects the phase difference AF processing unit 19, and causes the phase difference AF processing unit 19 to determine the focusing position and performs the focusing control of the photographing lens 1 according to the determined focusing position (step S89).

In the meantime, when a plurality of pair lines are present in the selected AF area 53, the phase difference AF processing unit 19 performs the processes of steps S82 to S86 for each pair line to generate the credibility determination value J3.

When a pair line in which the credibility determination value J3 is less than the threshold value TH2 is present among the plurality of pair lines, the system control unit 11 determines that the credibility of the focusing control by the phase difference AF method with respect to the selected AF area 53 is high. Also, the system control unit 11 causes the phase difference AF processing unit 19 to determine the focusing position using the detection signal read from the pair line in which the credibility determination value J3 is less than the threshold value TH2 at step S89.

Here, when a plurality of pair lines in which the credibility determination values J3 are less than the threshold value TH2 are present, the phase difference AF processing unit 19 determines the focusing position based on, for example, an average of the amount of defocus calculated for each pair line.

When a pair line in which the credibility determination value J3 is less than the threshold value TH2 is not present among a plurality of pair lines, the system control unit 11 determines that the credibility of the focusing control by the phase difference AF method with respect to the selected AF area 53 is low and performs the process of step S88.

As described above, according to an example of operations illustrated in FIG. 9, the credibility of the phase difference AF may be determined without performing the correlation calculation and thus, the credibility determination may be performed at high speed.

Further, even when the credibility of the phase difference AF is low and thus, the focusing control is shifted to the focusing control by the contrast AF method, an amount of calculation is reduced as much as an amount that the correlation calculation is not performed and thus, power consumption may be reduced.

Even in a case where the credibility determination value is obtained based on a ratio of the integrated value of the detection signals of the phase difference detection pixels 52A and the integrated value of the detection signals of the phase difference detection pixels 52B, the credibility determination value may be generated by defining the pixel pairs P3 and P4 rather than the pixel pairs P1 and P2 as pixel pairs to be set in the pair line.

Further, both the pixel pairs P1 and P2 and the pixel pairs P3 and P4 are defined as pixel pairs to be set in the pair line to obtain the credibility determination value J3 with respect to the pixel pairs P1 and P2 and the credibility determination value J4 with respect to the pixel pairs P3 and P4, and a determination as to whether the phase difference AF is to be performed may be made based on the credibility determination value J3 and the credibility determination value J4. Hereinafter, operations of the digital camera for determining as to whether the phase difference AF is to be performed by obtaining and using the credibility determination values J3 and J4.

Figure 10:
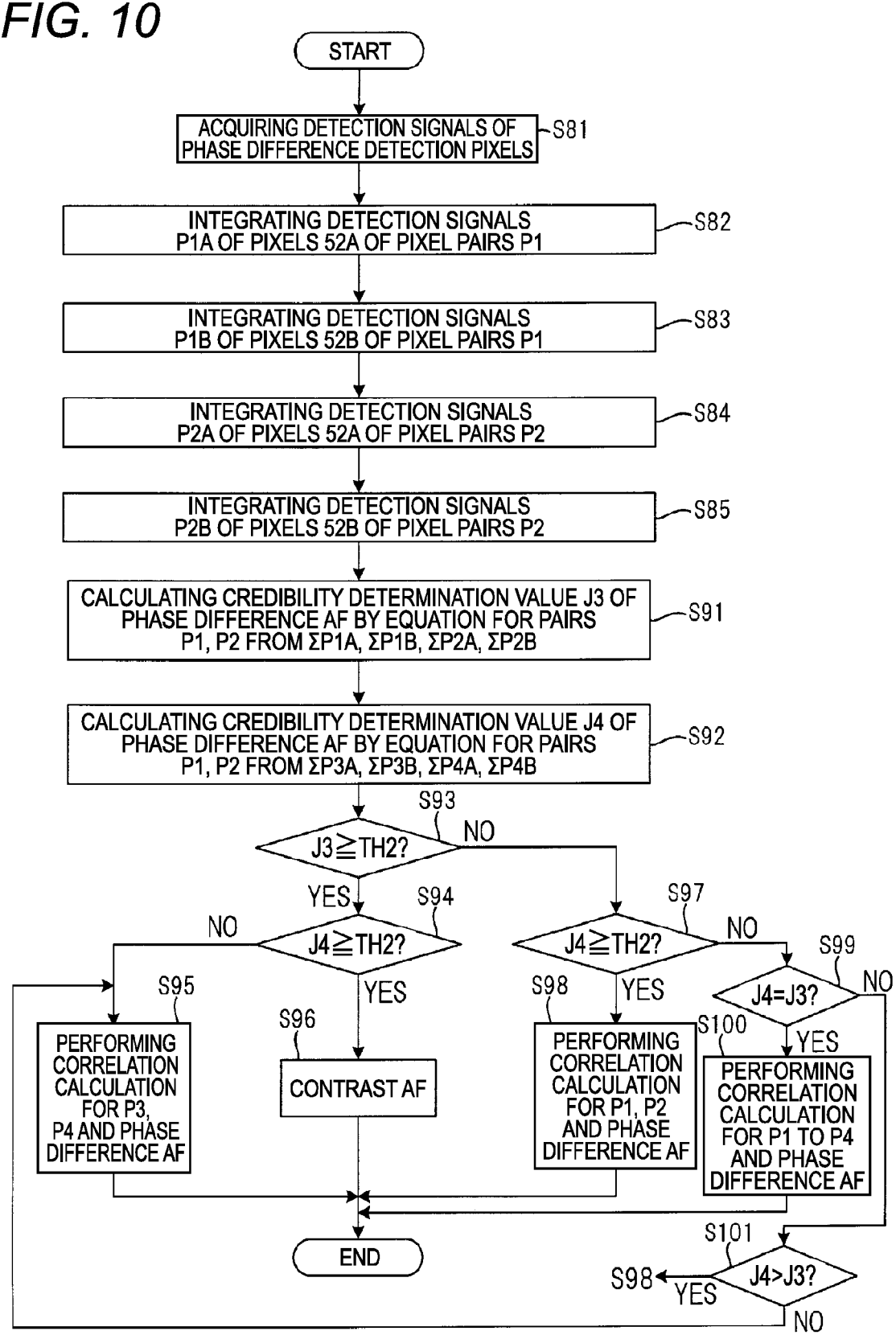
FIG. 10 is a flowchart for explaining another modified example of AF operations of the digital camera illustrated in FIG. 1.

FIG. 10 is a flowchart for explaining another modified example of AF operations of the digital camera illustrated in FIG. 1. In FIG. 10, similar reference numerals are given to the same processes as those illustrated in FIG. 9, and descriptions thereof are omitted.

After step S85, the phase difference AF processing unit 19 generates the credibility determination value J3 by calculating the equation 4 based on ΣP1A, ΣP1B, ΣP2A and ΣP2B (step S91).

Subsequently, the phase difference AF processing unit 19 generates the credibility determination value J4 by calculating the equation (5) based on ΣP3A, ΣP3B, ΣP4A and ΣP4B (step S92).

[Equation 5]

$$J4 = \left| \frac{\sum P3A}{\sum P3B} - \frac{\sum P4A}{\sum P4B} \right| \quad (5)$$

In Equation 5, ΣP3A indicates the integrated value of the detection signals of the phase difference detection pixels 52A that belong to all the pixel pairs P3 present in the pair line, and is the same value as ΣP1A.

ΣP3B indicates the integrated value of the detection signals of the phase difference detection pixels 52B that belong to all the pixel pairs P3 present in the pair line, and is the same value as ΣP2B.

ΣP4A indicates the integrated value of the detection signals of the phase difference detection pixels 52A that belong to all the pixel pairs P4 present in the pair line, and is the same value as ΣP2A.

ΣP4B indicates the integrated value of the detection signals of the phase difference detection pixels 52B that belong to all the pixel pairs P4 present in the pair line, and is the same value as ΣP1B.

Subsequently, when it is determined that J3≥TH2 ("YES" at step S93) and J4≥TH2 ("YES" at step S94), the system control unit 11 determines that the credibility of each of (i) the focusing position determined by the correlation calculation result (C1[d] described above) of the detection signals of the phase difference detection pixels 52A and 52B of the pixel pairs P1, (ii) the focusing position determined by the correlation calculation result (C2[d] described above) of the detection signals of the phase difference detection pixels 52A and 52B of the pixel pairs P2, (iii) the focusing position determined by the correlation calculation result (C3[d] described above) of the detection signals of the phase difference detection pixels 52A and 52B of the pixel pairs P3, and (iv) the focusing position determined by the correlation calculation result (C4[d] described above) of the detection signals of the phase difference detection pixels 52A and 52B of the pixel pairs P4 is low, and selects the contrast AF processing unit 18 to perform the focusing control (step S96).

When it is determined that J3≥TH2 ("YES" at step S93) and J4<TH2 ("NO" at step S94), the system control unit 11 determines that the credibility of each of the focusing position determined by the correlation calculation result C3[d] and the focusing position determined by the correlation calculation result C4[d] is high, and selects the phase difference AF processing unit 19.

Also, the system control unit 11 causes the phase difference AF processing unit 19 to determine the focusing position based on at least one of the correlation calculation result C3[d] and the correlation calculation result C4[d] and moves the focus lens to the determined focusing position (step S95).

When it is determined that J3<TH2 ("NO" at step S93) and J4≥TH2 ("YES" at step S97), the system control unit 11 determines that the credibility of each of the focusing position determined by the correlation calculation result C1[d] and the focusing position determined by the correlation calculation result C2[d] is high, and selects the phase difference AF processing unit 19.

Also, the system control unit 11 causes the phase difference AF processing unit 19 to determine the focusing position based on at least one of the correlation calculation result C1[d] and the correlation calculation result C2[d] and moves the focus lens to the determined the focusing position (step S98).

When it is determined that J3<TH2 ("NO" at step S93) and J4<TH2 ("NO" at step S97) and further, J3=J4 ("YES" at step S99), the system control unit 11 determines that the credibility of each of the focusing positions determined by the correlation calculation results C1[d] to C4[d] is high, and selects the phase difference AF processing unit 19.

Also, the system control unit 11 causes the phase difference AF processing unit 19 to determine the focusing position based on at least one of the correlation calculation results C1[d] to C4[d] and moves the focus lens to the determined focusing position (step S100).

When it is determined that J3<TH2 ("NO" at step S93) and J4<TH2 ("NO" at step S97) and further, J4≠J3 ("NO" at step S99), the system control unit 11 compares the credibility determination values J3 and J4 at S101.

When the comparison result is J4>J3 at step S101, the credibility of the phase difference AF using the correlation calculation results C1[d] and C2[d] is higher than that using the correlation calculation results C3[d] and C4[d], and thus the process of step S98 is performed. In the meantime, when the comparison result is J4<J3, the credibility of the phase difference AF using the correlation calculation results C3[d] and C4[d] is higher than that using the correlation calculation results C1[d] and C2[d], and thus the process of step S95 is performed.

As described above, according to the example of operations of FIG. 10, even in a case where credibility determined based only on one credibility determination value is low, when credibility determined based on the other credibility determination value is high, the focusing control by the phase difference AF method is performed. Therefore, compared to the example of operations of FIG. 9, a possibility that the phase difference AF method is adopted may be increased and thus, it becomes possible to perform AF at high speed.

Further, the focusing position may be determined using four correlation calculation results at maximum at the process of step S100 and thus, determination accuracy of the focusing position may be increased.

Heretofore, two adjacent pixel lines, each of which includes the phase difference detection pixels 52A and 52B present in the AF area 53, are set as one block, and the detection signals of the respective phase difference detection pixels 52A and 52B present in the block is used to perform the credibility of the focusing control by the phase difference AF method using the detection signals.

As a modified example of the block, three or more pixel lines including the phase difference detection pixels present in the AF area 53 are set as one block, and the detection signals of the respective phase difference detection pixels 52A and 52B present in the block may be used to perform the credibility of the focusing control by the phase difference AF method using the detection signals. Hereinafter, a modified example of an arrangement of the phase difference detection pixels within the block will be described.

First Modified Example

Figure 11:
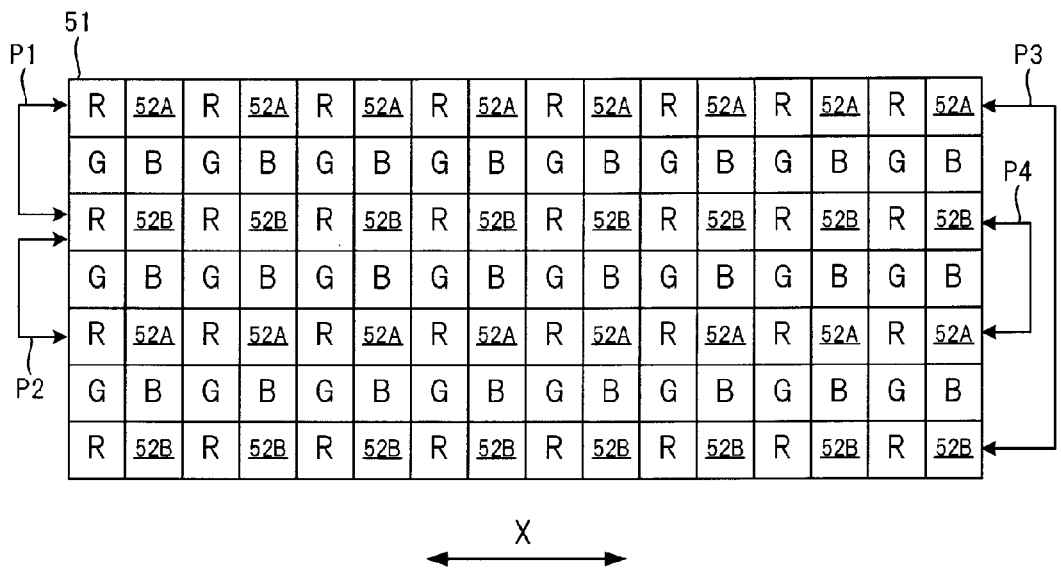
FIG. 11 is a view illustrating a modified example of an arrangement of phase difference detection pixels 52A and 52B present in an AF area 53 of the solid-state image capturing element 5 illustrated in FIG. 1.

FIG. 11 is a view illustrating a modified example of an arrangement of phase difference detection pixels 52A and 52B present in the AF area 53 of the solid-state image capturing element 5 illustrated in FIG. 1.

In the example of the arrangement illustrated in FIG. 11, two phase difference pixel lines, each of which includes a plurality of the phase difference detection pixels 52A parallel in the row direction X, and two phase difference pixel lines, each of which includes a plurality of the phase difference detection pixels 52B parallel in the row direction X, are formed in the AF area 53, and the credibility determination is performed by setting four phase difference pixel lines as one block. In the meantime, all the pixels located at the same position in the row direction X within the block are located adjacently with each other to the extent that light from the same portion of the subject is received.

In one block illustrated in FIG. 11, each phase difference detection pixel included in the phase difference pixel line of an odd-numbered row is the phase difference detection pixel 52A and each phase difference detection pixel included in the phase difference pixel line of the even-numbered row is the phase difference detection pixel 52B.

In the example of the arrangement illustrated in FIG. 11, each phase difference detection pixel 52A of the phase difference pixel line of the first row within the block and each phase difference detection pixel 52B disposed to be adjacent to each phase difference detection pixel 52A in downward direction by being spaced apart by one pixel, are set as the pixel pair P1.

Further, each phase difference detection pixel 52A of the phase difference pixel line of the third row within the block and each phase difference detection pixel 52B disposed to be adjacent to each phase difference detection pixel 52A in upward direction by being spaced apart by one pixel, are set as the pixel pair P2.

Further, each phase difference detection pixel 52A of the phase difference pixel line of the first row within the block and each phase difference detection pixel 52B disposed to be adjacent to each phase difference detection pixel 52A in downward direction by being spaced apart by five pixels, are set as the pixel pair P3.

Further, each phase difference detection pixel 52A of the phase difference pixel line of the third row within the block and each phase difference detection pixel 52B disposed to be adjacent to each phase difference detection pixel 52A in upward direction by being spaced apart by one pixel, are set as the pixel pair P4.

In the example of the arrangement illustrated in FIG. 11, ΣP1B in the example of operations of FIG. 10 becomes equal to ΣP2B and thus, the phase difference AF processing unit 19, instead of step S85 of FIG. 8, integrates the detection signals of the phase difference detection pixels 52B of the pixel pair P3 to calculate ΣP3B. Also, the credibility determination value J4 is calculated by substituting ΣP3A (=ΣP1A), ΣP3B, ΣP4A (=ΣP2A), ΣP4B (=ΣP1B) into the equation (5) at step S92.

In the meantime, when the arrangement of FIG. 11 is applied to operations of FIG. 10, each phase difference detection pixel 52A of the phase difference pixel line of the first row within the block and each phase difference detection pixel 52B disposed to be adjacent to each phase difference detection pixel 52A in downward direction by being spaced apart by one pixel may be set as the pixel pair P4 and each phase difference detection pixel 52A of the phase difference pixel line of the third row within the block and each phase difference detection pixel 52B disposed to be adjacent to each phase difference detection pixel 52A in downward direction by being spaced apart by one pixel, are set as the pixel pair P3.

The example of the arrangement illustrated FIG. 11 is an arrangement of the phase difference detection pixels generally used and thus, may be easily applied to a known solid-state image capturing element and has high versatility.

Second Modified Example

Figure 12:
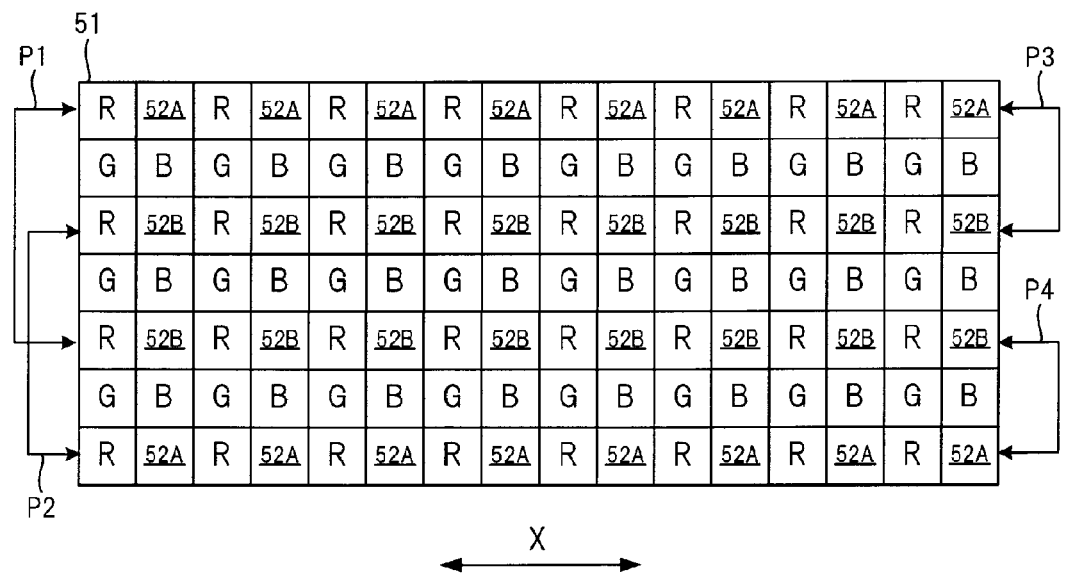
FIG. 12 is a view illustrating another modified example of the arrangement of the phase difference detection pixels 52A and 52B present in the AF area 53 of the solid-state image capturing element 5 illustrated in FIG. 1.

FIG. 12 is a view illustrating another modified example of an arrangement of phase difference detection pixels 52A and 52B present in the AF area 53 of the solid-state image capturing element 5 illustrated in FIG. 1.

In the example of the arrangement illustrated in FIG. 12, two phase difference pixel lines, each of which includes a plurality of the phase difference detection pixels 52A parallel in the row direction X and two phase difference pixel lines, each of which includes a plurality of the phase difference detection pixels 52B parallel in the row direction X, are formed in the AF area 53, and the credibility determination is performed by setting four phase difference pixel lines as one block. In the meantime, all the pixels located at the same position in the row direction X within the block are located adjacently with each other to the extent that light from the same portion of the subject is received.

In one block illustrated in FIG. 12, each phase difference detection pixel included in the phase difference pixel lines of the first row and the fourth row is the phase difference detection pixel 52A and each phase difference detection pixel included in the phase difference pixel lines of the second row and the third row is the phase difference detection pixel 52B.

In the example of the arrangement illustrated in FIG. 12, each phase difference detection pixel 52A of the phase difference pixel line of the first row within the block and each phase difference detection pixel 52B disposed to be adjacent to each phase difference detection pixel 52A in downward direction by being spaced apart by three pixels, are set as the pixel pair P1.

Further, each phase difference detection pixel 52A of the phase difference pixel line of the fourth row within the block and each phase difference detection pixel 52B disposed to be adjacent to each phase difference detection pixel 52A in upward direction by being spaced apart by three pixels, are set as the pixel pair P2.

Further, each phase difference detection pixel 52A of the phase difference pixel line of the first row within the block and each phase difference detection pixel 52B disposed to be adjacent to each phase difference detection pixel 52A in downward direction by being spaced apart by one pixel, are set as the pixel pair P3.

Further, each phase difference detection pixel 52A of the phase difference pixel line of the fourth row within the block and each phase difference detection pixel 52B disposed to be adjacent to each phase difference detection pixel 52A in upward direction by being spaced apart by one pixel, are set as the pixel pair P4.

According to the example of the arrangement illustrated in FIG. 12, distances between two phase difference detection pixels that constitute a pixel pair are set to be identical with each other in each of pixel pairs P1 and P2 and pixel pairs P3 and P4, respectively, and thus, the credibility determination may be performed at high accuracy as compared to the example of the arrangement illustrated in FIG. 11.

Further, the maximum distance between two phase difference detection pixels that constitute each pixel pair amounts to three pixels and thus, the credibility determination may be performed at high accuracy as compared to the example of FIG. 11.

Third Modified Example

Figure 13:
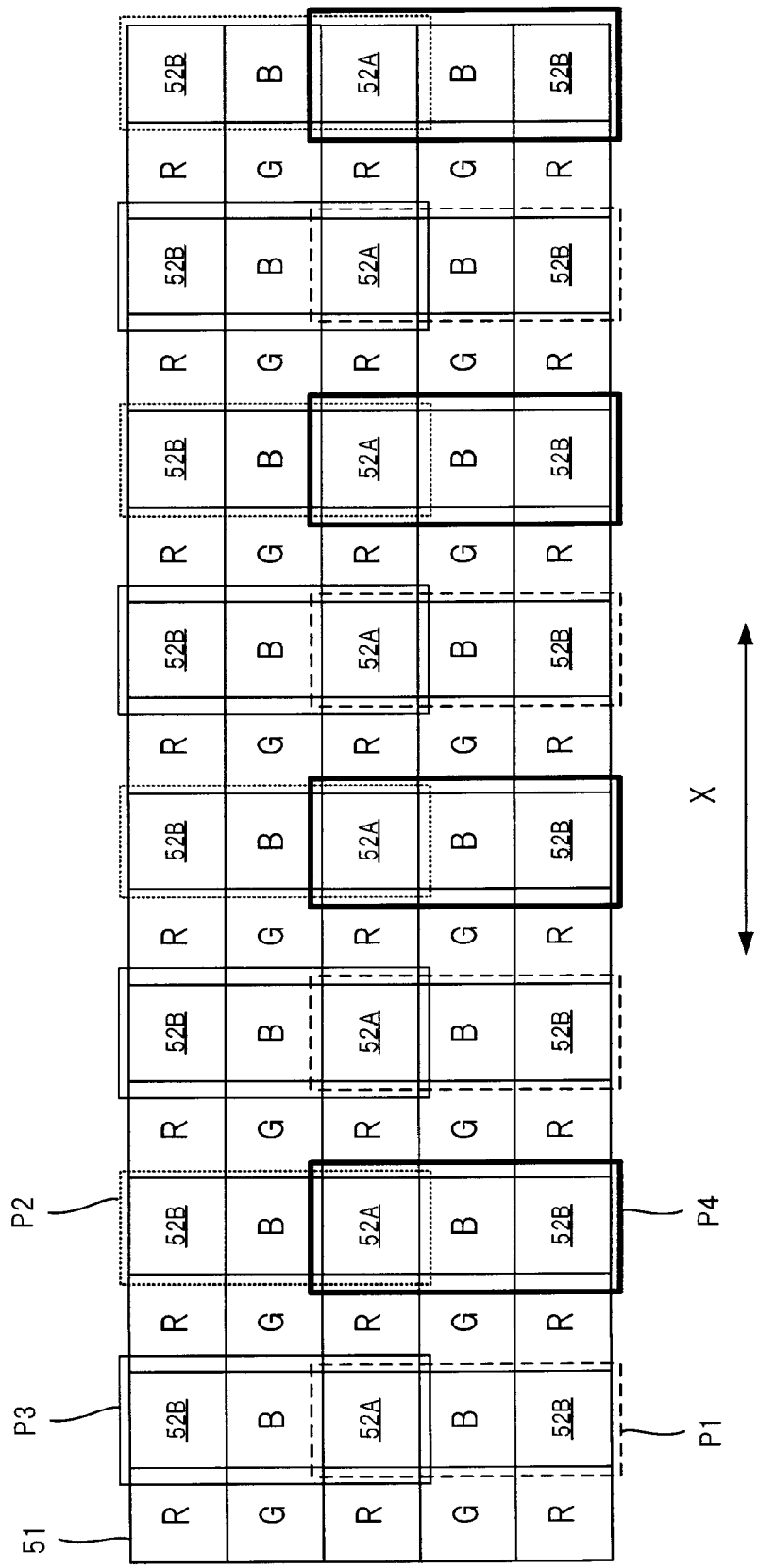
FIG. 13 is a view illustrating another modified example of the arrangement of phase difference detection pixels 52A and 52B present in the AF area 53 of the solid-state image capturing element 5 illustrated in FIG. 1.

FIG. 13 is a view illustrating another modified example of an arrangement of phase difference detection pixels 52A and 52B present in an AF area 53 of the solid-state image capturing element 5 illustrated in FIG. 1.

In the example of the arrangement illustrated in FIG. 13, two phase difference pixel lines, each of which includes a plurality of the phase difference detection pixels 52B parallel in the row direction X and one phase difference pixel line which includes a plurality of the phase difference detection pixels 52A parallel in the row direction X, are formed in the AF area 53 and the credibility determination is performed by setting three phase difference pixel lines as one block. In the meantime, all the pixels located at the same position in the row direction X within the block are located adjacently with each other to the extent that light from the same portion of the subject is received.

In the example of the arrangement illustrated in FIG. 13, each phase difference detection pixel 52A present in odd-numbered columns among the phase difference detection pixels 52A of the phase difference pixel line of the second row within the block and each phase difference detection pixel 52B disposed to be adjacent to each phase difference detection pixel 52A in downward direction by being spaced apart by one pixel, are set as the pixel pair P1.

Further, each phase difference detection pixel 52A present in even-numbered columns among the phase difference detection pixels 52A of the phase difference pixel line of the second row within the block and each phase difference detection pixel 52B disposed to be adjacent to each phase difference detection pixel 52A in upward direction by being spaced apart by one pixel, are set as the pixel pair P2.

Further, each phase difference detection pixel 52A present in odd-numbered column among the phase difference detection pixels 52A of the phase difference pixel line of the second row within the block and each phase difference detection pixel 52B disposed to be adjacent to each phase difference detection pixel 52A in upward direction by being spaced apart by one pixel, are set as the pixel pair P3.

Further, each phase difference detection pixel 52A present in even-numbered column among the phase difference detection pixels 52A of the phase difference pixel line of the second row within the block and each phase difference detection pixel 52B disposed to be adjacent to each phase difference detection pixel 52A in downward direction by being spaced apart by one pixel, are set as the pixel pair P4.

According to the example of the arrangement illustrated in FIG. 13, the credibility determination is performed by setting three phase difference pixel line as one block and thus, the number of phase difference pixel lines used in the credibility determination may be reduced as compared to the examples of the arrangement illustrated in FIG. 11 and FIG. 12.

Further, distances between two phase difference detection pixels that constitute a pixel pair are set to be identical with each other in each of pixel pairs P1 and P2 and pixel pairs P3 and P4, respectively, and thus, the credibility determination may be performed at high accuracy as compared to the example of the arrangement illustrated in FIG. 11.

Further, the maximum distance between two phase difference detection pixels that constitute each pixel pair amounts to one pixel and thus, the credibility determination may be performed at high accuracy as compared to the examples of FIG. 11 and FIG. 12.

Fourth Modified Example

Figure 14:
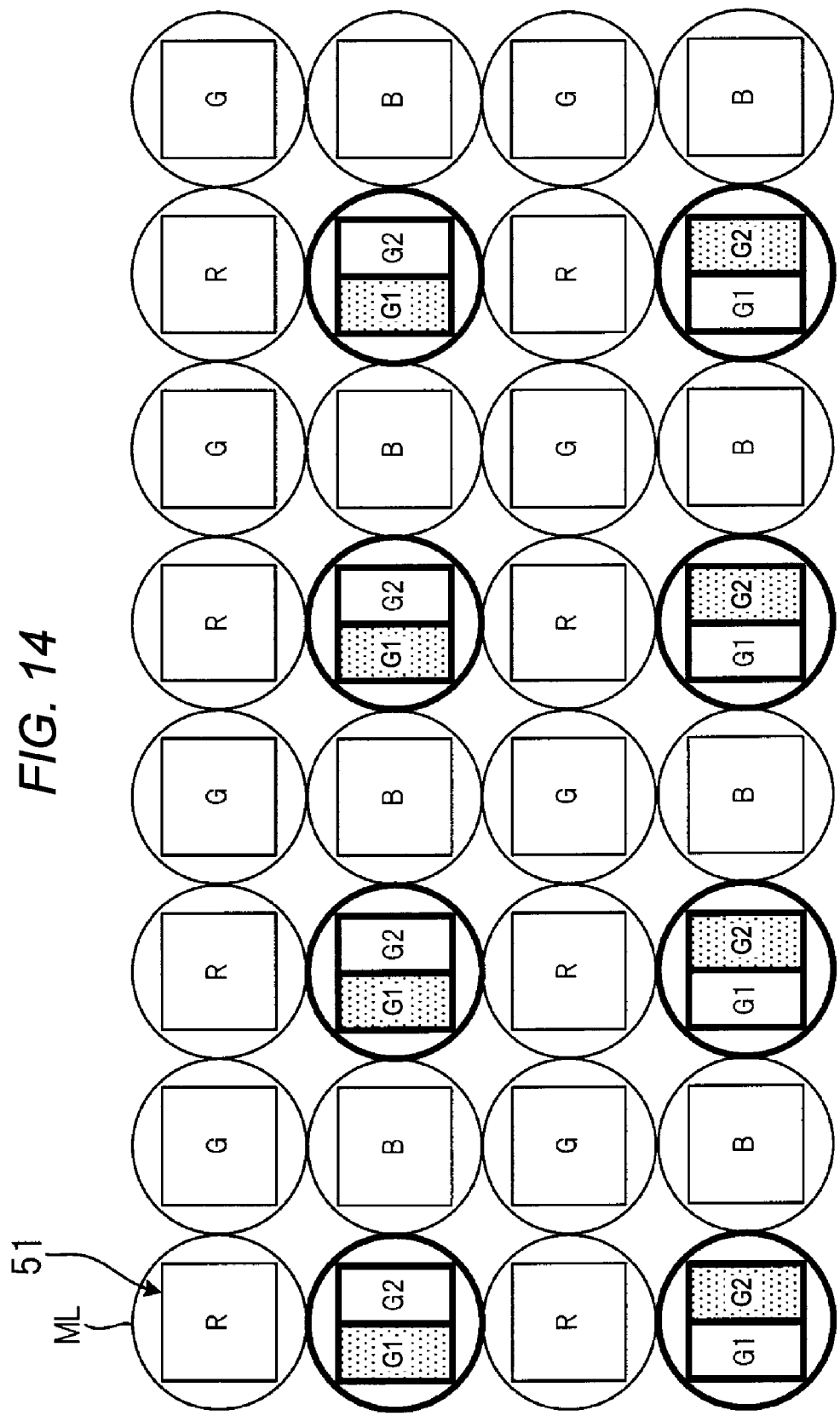
FIG. 14 is a view illustrating a modified example of a configuration of the AF area 53 of the solid-state image capturing element 5 illustrated in FIG. 1.

FIG. 14 is a view illustrating a modified example of a pixel arrangement present in the AF area 53 of the solid-state image capturing element 5 illustrated in FIG. 1.

In the example of the pixel arrangement illustrated in FIG. 14, each photoelectric conversion unit of some G pixels 51 present in the AF area 53 is divided into two, and a pixel (pixel denoted by "G1") corresponding to a left photoelectric conversion unit among two divided photoelectric conversion units is set as the phase difference detection pixel 52A and a pixel (pixel denoted by "G2") corresponding to a right photoelectric conversion unit among two divided photoelectric conversion units is set as the phase difference detection pixel 52B.

A single microlens 51 is provided on each pixel 51 and the single microlens 51 is also provided over the phase difference detection pixel 52A and the phase difference detection pixel 52B obtained by dividing the photoelectric conversion unit of one pixel 51 into two.

Accordingly, the phase difference detection pixel 52A is configured to receive light having passed through a half of the pupil area of the image capturing lens 1 and the phase difference detection pixel 52B is configured to receive light having passed through the other half of the pupil area of the image capturing lens 1.

In the example of the arrangement, two phase difference pixel lines, each of which includes pixels 51 each including the phase difference detection pixel 52A and the phase difference detection pixel 52B and is parallel in the row direction X, are formed in the column direction Y in the AF area 53, and the credibility determination is performed by setting two phase difference pixel lines as one block. In the meantime, all the microlens ML located at the same position in the row direction X within the block are located adjacently with each other to the extent that light from the same portion of the subject is received.

In the example of the arrangement illustrated in FIG. 14, each phase difference detection pixel 52A (the pixel with halftone dot meshing in FIG. 14) of the phase difference pixel line of the first row within the block and each phase difference detection pixel 52B (the pixel with halftone dot meshing in FIG. 14) of the second row disposed to be adjacent to each phase difference detection pixel 52A in obliquely rightward and downward, are set as the pixel pair P1.

Further, each phase difference detection pixel 52A (the pixel without halftone dot meshing in FIG. 14) of the phase difference pixel line of the second row within the block and each phase difference detection pixel 52B (the pixel without halftone dot meshing in FIG. 14) of the phase difference pixel line of the first row disposed to be adjacent to each phase difference detection pixel 52A in obliquely rightward and upward direction, are set as the pixel pair P2.

Further, each phase difference detection pixel 52A of the phase difference pixel line of the first row within the block and each phase difference detection pixel 52B disposed to be adjacent to the phase difference detection pixel 52A rightward, are set as the pixel pair P3.

Further, each phase difference detection pixel 52A of the phase difference pixel line of the second row within the block and each phase difference detection pixel 52B disposed to be adjacent to the phase difference detection pixel 52A rightward, are set as the pixel pair P4.

In the meantime, in the arrangement illustrated in FIG. 14, when the pixel 51 divided into the phase difference detection pixel 52A and the phase difference detection pixel 52B is used as an image capturing pixel, a signal in which the detection signal of the phase difference detection pixel 52A and the detection signal of the phase difference detection pixel 52B are added needs to be handled as a signal output from the pixel 51.

Further, the arrangement illustrated in FIG. 14 may be configured such that all the pixels 51 as well as some G pixels 51 are divided into two. In this case, the pixel pair used in the credibility determination may be changed according to color of the subject and thus, a high-accuracy phase difference AF becomes possible.

Further, in the configuration in which all the pixels 51 are divided into two, the credibility determination may be performed for each color to perform the phase difference AF using the phase difference detection pixel having a color for which high credibility is obtained, and a possibility that the phase difference AF is performed may be increased or an accuracy of the phase difference AF may be improved.

The arrangement illustrated in FIG. 14 has a configuration in which the phase difference detection pixel 52A and the phase difference detection pixel 52B are formed below a single microlens ML and thus, the number of image capturing pixels may be increased as compared to a configuration in which the microlens ML is provided separately on each of the phase difference detection pixel 52A and the phase difference detection pixel 52B. Further, at the time of image capturing, signals for the phase difference detection pixel 52A and the phase difference detection pixel 52B located at substantially the same position may be added to obtain a signal for one pixel and thus, the pixel interpolation processing becomes unnecessary and may improve a quality of captured image.

Heretofore, the focusing control is performed by the contrast AF method in a case where the determination result at step S45 of FIG. 5 is "YES", the determination result at step S65 of FIG. 7 is "YES", the determination result at step 87 of FIG. 9 is "YES", and the determination result at step S94 of FIG. 10 is "YES", but is not limited thereto. For example, in the case described above, notification indicating that the AF is impossible may be sent to the user.

In the present specification, the digital camera is exemplified as an image capturing apparatus, but an embodiment of a smart phone equipped with a camera as the image capturing apparatus will be described in the following.

Figure 15:
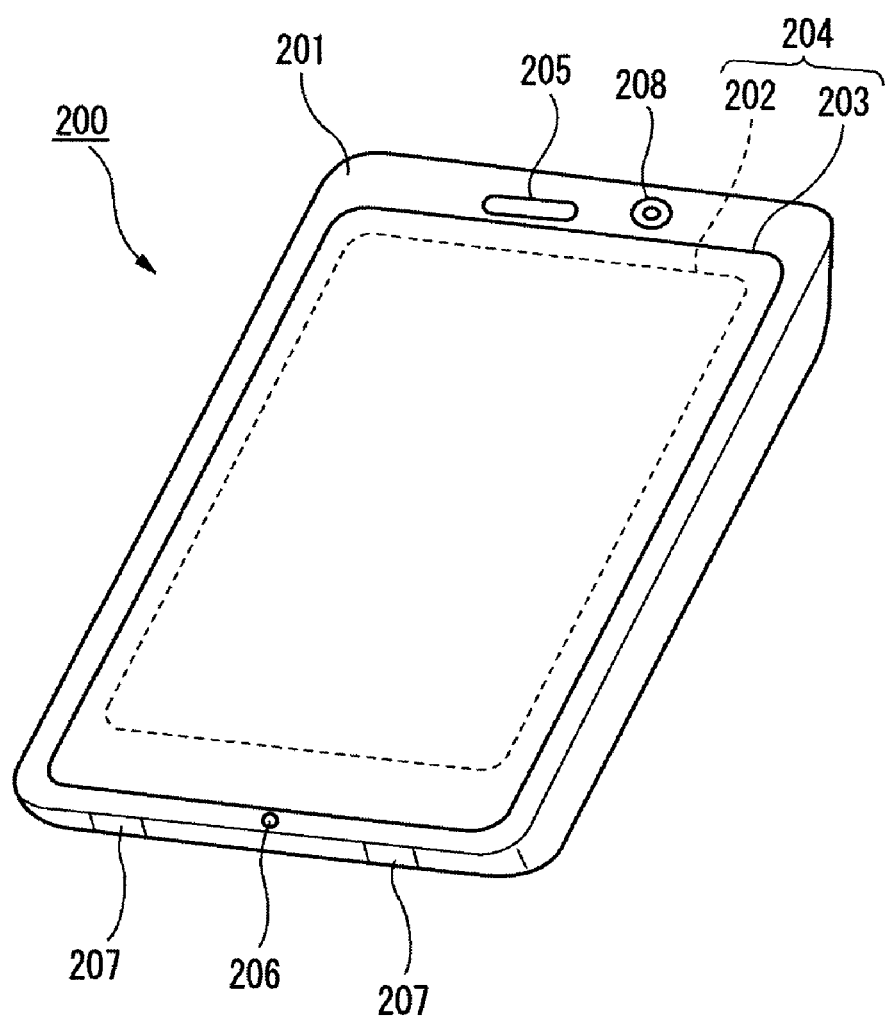
FIG. 15 is a view explaining a smart phone as an image capturing apparatus.

FIG. 15 is a view illustrating an outer appearance of a smart phone 200 which is an embodiment of a photographing apparatus of the present invention. The smart phone 200 illustrated in FIG. 15 has a planar case 201 and is provided with a display input unit 204 integrally formed with a display panel 202 as a display unit and a manipulation panel 203 as an input unit on a surface of one side of the case 201. Further, the case 201 includes a speaker 205, a microphone 206, a manipulation unit 207 and a camera unit 208. In the meantime, a configuration of the case 201 is not limited thereto and may adopt, for example, a configuration in which the display unit and the input unit are provided as an independent element or a configuration equipped with a folding structure or a sliding mechanism.

Figure 16:
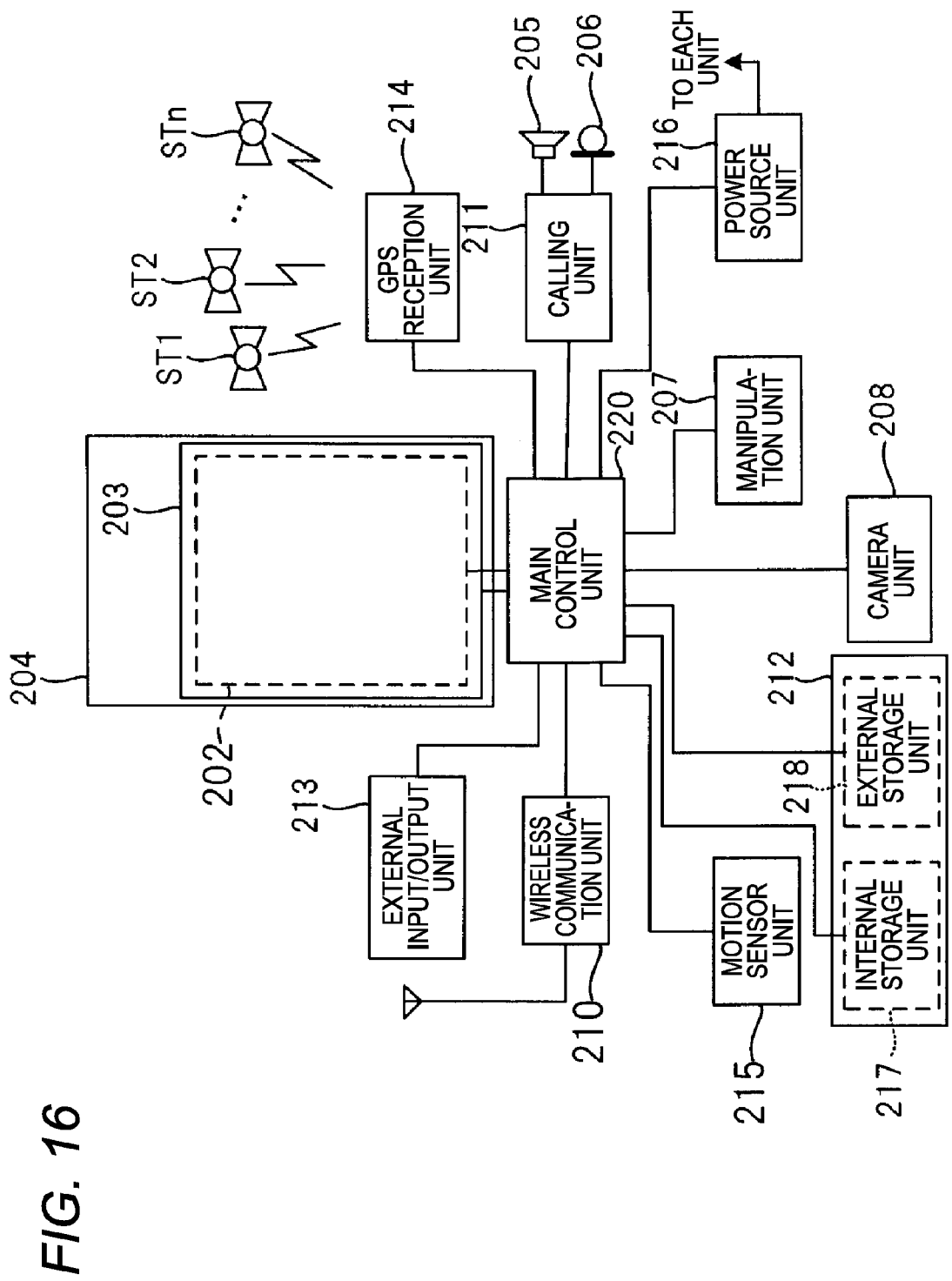
FIG. 16 is a block diagram illustrating an internal configuration of the smart phone of FIG. 15.

FIG. 16 is a block diagram illustrating a configuration of the smart phone 200 illustrated in FIG. 15. As illustrated in FIG. 15, the smart phone 200 includes a wireless communication unit 210, a display input unit 204, a calling unit 211, a manipulation unit 207, a camera unit 208, a storage unit 212, an external input/output unit 213, a GPS (Global Positioning System) reception unit 214, a motion sensor unit 215, a power supply unit 216, and a main control unit 220 as principal constitutional elements of the smart phone. Further, the smart phone 200 is equipped with a wireless communication function which enables a mobile wireless communication through a base station BS (not illustrated) apparatus and a mobile communication network NW (not illustrated) as the principal function of the smart phone.

The wireless communication unit 210 performs the wireless communication with the base station BS belonging to the mobile communication network NW according to instruction of the main control unit 220. With the wireless communication, the wireless communication unit 210 transmits and/or receives various file data such as, for example, voice data or image data or e-mail data, or receives Web data or streaming data.

The display input unit 204 is so called a touch panel which displays, for example, an image (still image and moving image) or character information to visually deliver information to the user and detect a user manipulation with respect to the displayed information by the control of the main control unit 220, and includes the display panel 202 and the manipulation panel 203.

The display panel 202 is a display panel in which, for example, an LCD (Liquid Crystal Display) or an OELD (Organic Electro-Luminescence Display) is used as a display device.

The manipulation panel 203 is a device mounted to be able to view an image displayed on a display surface of the display panel 202 to detect a single or plural coordinates manipulated by a stylus or a finger of the user. When the device is manipulated by the stylus or the finger of the user, a detection signal generated due to the manipulation is output to the main control unit 220. Subsequently, the main control unit 220 detects a manipulation position (coordinates) on the display panel 202 based on the received detection signal.

As illustrated in FIG. 15, the display panel 202 and the manipulation panel 203 of the smart phone 200 exemplified as an embodiment of the photographing apparatus of the present invention are integrally formed to configure the display input unit 204, and the manipulation panel 203 is arranged to completely cover the display panel 202.

When such an arrangement is adopted, the manipulation panel 203 may be provided with function which also detects the user manipulation for an area which is outside of the display panel 202. In other words, the manipulation panel 203 may be provided with a detection area (hereinafter, referred to as a display area) with respect to a portion overlapped with the display panel 202 and a detection area (hereinafter, referred to as a non-display area) with respect to an outer peripheral portion not overlapped with the display panel 202 other than the overlapped portion.

In the meantime, a size of the display area may be completely coincident with the size of the display panel 202, but both sizes need not to be completely coincident with each other. Further, the manipulation panel 203 may be provided with two sensitive areas of the outer peripheral portion and an inner portion other than the outer peripheral portion. Further, a width of the outer peripheral portion is adequately designed according to, for example, the size of the case 201. Further, the position detection method adopted in the manipulation panel 203 may include a matrix switch method, a resistance film type, a surface acoustic wave method, an infrared method, an electromagnetic induction method, for example, an electrostatic capacitance method and any of which may be adopted.

The calling unit 211 is provided with the speaker 205 or the microphone 206, and converts voice of the user input from the microphone 206 into a voice data capable of being processed in the main control unit 220 to output the converted data to the main control unit 220, or decodes the voice data received by the wireless communication unit 210 or the external input/output unit 213 to output the decoded data from the speaker 205. Further, as illustrated in FIG. 15, for example, the speaker 205 may be mounted on the same surface as the surface on which the display input unit 204 is provided and the microphone 206 may be mounted on a side surface of the case 201.

The manipulation unit 207 is a hardware key using such as a key switch, and functions to receive instruction from the user. For example, as illustrated in FIG. 15, the manipulation unit 207 is mounted on the side surface of the case 201 of the smart phone 200 and is a depression button type switch which operates in such a manner that when the manipulation unit 207 is depressed by a finger, the manipulation unit 207 is turned ON, and when a finger is detached from manipulation unit 207, the manipulation unit 207 is turned OFF by restoring, for example, force of a spring.

The storage unit 212 stores a control program or a control data of the main control unit 220, an application software, an address data to which a name or a telephone number of a communication counterpart is corresponded, data of the received and/or transmitted e-mail, a Web data downloaded by Web browsing, a downloaded contents data, and also temporarily stores streaming data. Further, the storage unit 212 is configured by an internal storage unit 217 built in the smart phone and an external storage unit 218 having an external memory slot which is freely detachable. In the meantime, each of the internal storage unit 217 and the external storage unit 218 constituting the storage unit 212 is implemented by a storage medium such as a flash memory type memory, a hard disk type memory, a multimedia card micro type memory, a card type memory (e.g., MicroSD (registered trademark) memory), an RAM (Random Access Memory), an ROM (Read Only Memory).

The external input/output unit 213 serves as an interface which performs interfacing with all the external equipments connected to the smart phone 200 and is used for directly or indirectly connecting to other external equipments by communication (e.g., universal serial bus (USB), IEEE1394) or a network (e.g., Internet, wireless LAN, Bluetooth (registered trademark), RFID (Radio Frequency Identification), infrared communication (Infrared Data Association (IrDA)) (registered trademark), UWB (Ultra Wideband) (registered trademark), ZigBee (registered trademark)).

The external equipment connected to the smart phone 200 includes, for example, a wired/wireless headset, a wired/wireless external charger, a wired/wireless data port, a Memory card or a SIM (Subscriber Identity Module) card/UIM (User Identity Module Card) card connected through a card socket, an external audio/video equipment connected through an audio/video I/O (Input/Output) terminal, a wireless connected external audio/video equipment, a wired/wireless connected smart phone, a wired/wireless connected personal computer, a wired/wireless connected PDA, and an earphone. The external input/output unit 213 may deliver data transferred from the external device to each internal constitutional element of the smart phone 200 or allow internal data of the smart phone 200 to be transferred to the external device.

The GPS reception unit 214 receives GPS signals transmitted from GPS satellites ST1 to STn according to instruction of the main control unit 220, performs a positioning calculation process based on the received plurality of GPS signals, and detects a position having latitude, longitude and an altitude of the corresponding smart phone 200. When position information may be acquired from the wireless communication unit 210 or the external input/output unit 213 (e.g., wireless LAN), the GPS reception unit 214 may detect the position using the position information.

The motion sensor unit 215 includes, for example, 3-axis acceleration sensor to detect physical movement of the smart phone 200 according to instruction of the main control unit 220. The physical movement of the smart phone 200 is detected and thus, a movement direction or an acceleration of the smart phone 200 is detected. The detection result is output to the main control unit 220.

The power supply unit 216 serves to supply power stored in a battery (not illustrated) to each unit of the smart phone 200 according to instruction of the main control unit 220.

The main control unit 220 includes a microprocessor, and operates according to a control program or control data stored in the storage unit 212 to comprehensively control each unit of the smart phone 200. Further, the main control unit 220 is equipped with a mobile communication control function which controls each unit of a communication system and an application processing function in order to perform voice communication or data communication through the wireless communication unit 210.

The main control unit 220 operates according to the application software stored in the storage unit 212 to implement the application processing function. The application processing function includes, for example, an infrared communication function for performing a data communication with a counterpart equipment by controlling the external input/output unit 213, an email function for transmitting and receiving email and a Web browsing function for reading a Web page.

Further, the main control unit 220 is equipped with, for example, an image processing function for displaying an image on the display input unit 204 based on an image data (data of still image or moving image) such as the received data or downloaded streaming data. The image processing function refers to a function that the main control unit 220 decodes the image data, performs an image processing on the decoded result and displays the image on the display input unit 204.

Further, the main control unit 220 performs a display control for the display panel 202 and a manipulation detection control which detects user manipulation through the manipulation unit 207 and the manipulation panel 203. With the display control performance, the main control unit 220 displays a software key such as an icon or a scroll bar for activating application software, or a window for preparing an email. In the meantime, the scroll bar indicates a software key for receiving instruction to move a displayed portion of an image with respect to a larger image which may not be completely fitted into a display area of the display panel 202.

Further, with the manipulation detection control performance, the main control unit 220 detects user manipulation through the manipulation unit 207, or receives manipulation with respect to the icon or input of a character string with respect to an input column of the window or a scroll request of the display image through the scroll bar through the manipulation panel 203.

Further, with the manipulation detection control performance, the main control unit 220 is equipped with a touch panel control function which determines whether a manipulation position with respect to the manipulation panel 203 corresponds to an overlapped portion (display area) overlapped with the display panel 202 or an outer peripheral portion (non-display area) not overlapped with the display panel 202 other than the overlapped portion to control a sensitive area of the manipulation panel 203 or a display position of the software key.

Further, the main control unit 220 may detect gesture manipulation with respect to the manipulation panel 203 to perform a preset function according to the detected gesture manipulation. The gesture manipulation is different from the conventional simple touch manipulation and indicates manipulation which draws, for example, a locus using fingers, designates a plurality of positions simultaneously, or combines the drawing and designation to draw a locus with respect to at least one gesture at the plurality of positions, not.

The camera unit 208 includes constitutional elements other than the external memory control unit 20, the recording medium 21, the display control unit 22, the display unit 23 and the manipulation unit 14 in the digital camera illustrated in FIG. 1. The image captured data generated by the camera unit 208 may be recorded in the storage unit 212 or output through the input/output unit 213 or the wireless communication unit 210. In the smart phone 200 illustrated in FIG. 15, the camera unit 208 is mounted on the same surface as the display input unit 204, but a mounting position of the camera unit 208 is not limited thereto, and may be mounted on a rear surface of the display input unit 204.

Further, the camera unit 208 may be used for various functions of the smart phone 200. For example, image acquired by the camera unit 208 may be displayed on the display panel 202 or the image acquired by the camera unit 208 may be used as one of input by manipulation of the manipulation panel 203. Further, the GPS reception unit 214 may refer to the image from the camera unit 208 to detect a position upon detecting the position. Furthermore, the GPS reception unit 214 may also refer to the image from the camera unit 208 to determine an optical axis of the camera unit 208 of the smart phone 200 or current use environment thereof without using the three-axis acceleration sensor or with using the three-axis acceleration sensor. The image from the camera unit 208 may be used in the application software as well.

Additionally, it is possible to add, for example, position information acquired by the GPS reception unit 214, voice information (which may be the text information having been subjected to, for example, voice text conversion by the main control unit) acquired by the microphone 206, posture information acquired by the motion sensor unit 215, to image data of a still image or moving image to record the information into the recording unit 21 or output the information through the input/output unit 213 or the wireless communication unit 210.

Also, in the smart phone 200 having the configuration described above, the solid-state image capturing element 5 is used as an image capturing element of the camera unit 208 to perform processing exemplified in FIGS. 5, 7, 9 and 10 in the main control unit 220 and thus, the phase difference AF having high accuracy may be performed at high speed.

As having been described above, the following matters are disclosed in the present application.

A disclosed image capturing apparatus is an image capturing apparatus, comprising: an image capturing element configured to capture an image of a subject through an image capturing optical system, wherein the image capturing element comprises signal detection units having first signal detection units and second signal detection units, each of the first signal detection units is configured to detect a signal according to one of a pair of light fluxes, said one and the other of the pair of light fluxes having passed through different portions of a pupil area of the image capturing optical system, and each of the second signal detection units is configured to detect a signal according to the other of the pair of light fluxes; a focusing control unit configured to perform a focusing control of the image capturing optical system by a phase difference AF method using the detection signals of the first signal detection units and the second signal detection units; a matching degree generation unit configured to generate a first matching degree which corresponds to a matching degree of two images captured by a first pair using the detection signals of the respective signal detection units of the first pair, wherein the first pair is a pair of a first signal detection unit group of a plurality of the first signal detection units parallel in a phase difference detection direction by the first signal detection unit and the second signal detection unit and a signal detection unit group of the second signal detection units arranged to be spaced apart by a same distance in one direction with respect to the respective signal detection units of the first signal detection unit group, and a second matching degree which corresponds to a matching degree of two images captured by a second pair using the detection signals of the respective signal detection units of the second pair, wherein the second pair is a pair of a second signal detection unit group of a plurality of the first signal detection units arranged to be spaced apart by a same distance in a same direction with respect to the respective signal detection units of the first signal detection unit group and parallel in the phase difference detection direction and a signal detection unit group of the second signal detection units arranged to be spaced apart by a same distance in another direction different from the one direction with respect to the respective signal detection units of the second signal detection unit group; and a credibility determination unit configured to determine credibility of the focusing control by the phase difference AF method using the detection signals of the respective signal detection units of each of the first pair and the second pair based on the first matching degree and the second matching degree.

With such a configuration, credibility of the focusing control by the phase difference AF method may be determined using only signal of the signal detection unit and thus, the credibility determination may be performed at high speed.

The disclosed image capturing apparatus may have a configuration wherein the image capturing element includes a plurality of signal detection unit pairs having first signal detection unit pairs and second signal detection unit pairs, each of the signal detection unit pairs is a pair of the first signal detection unit and the second signal detection unit arranged in a direction intersecting with the detection direction with respect to the first signal detection unit, a positional relationship between the first signal detection unit and the second signal detection unit in the first signal detection unit pair is in reverse to that in the second signal detection unit pair, the image capturing element includes a pair line in which the first signal detection unit pairs and the second signal detection unit pairs are alternately parallel in the detection direction, and the matching degree generation unit obtains the first matching degree and the second matching degree by setting the first signal detection unit pairs included in the pair line as the first pair and setting the second signal detection unit pairs included in the pair line as the second pair, or by setting one group as the first pair and the other group as the second pair in a state where the signal detection units included in the pair line are divided into two groups, each of the groups are a group of the signal detection units located at a same position in a direction orthogonal to the detection direction.

With such a configuration, credibility may be determined using the detection signals of the signal detection units included in two lines nearest to each other among lines including the signal detection units and thus, a high accuracy credibility determination may be performed. Further, the number of lines that are target lines to be subjected to the detection signal reading for the credibility determination may be made minimum and thus, a time required for the credibility determination may be reduced.

The disclosed image capturing apparatus may have a configuration wherein the matching degree generation unit generates a result of correlation calculation between detection signal groups output from each of two signal detection unit groups constituting the first pair as the matching degree of two images captured by the first pair, and the matching degree generation unit generates a result of correlation calculation between detection signal groups output from each of two signal detection unit groups constituting the second pair as the matching degree of two images captured by the second pair.

With such a configuration, when the focusing control is performed by the phase difference AF method in high credibility, the focusing control by the phase difference AF method may be performed using the result of correlation calculation obtained previously and thus, focusing to the principal subject may be performed at high speed.

The disclosed image capturing apparatus may have a configuration wherein the matching degree generation unit generates a ratio of an integrated value of the detection signals of the first signal detection units and an integrated value of the detection signals of the second signal detection units output from two signal detection unit groups constituting the first pair as the matching degree of two images captured by the first pair, and the matching degree generation unit generates a ratio of an integrated value of the detection signals of the first signal detection units and an integrated value of the detection signals of the second signal detection units output from two signal detection unit groups constituting the second pair as the matching degree of two images captured by the second pair.

With such a configuration, credibility of the focusing control by the phase difference AF method may be determined without performing the correlation calculation and thus, the credibility determination may be performed at high speed. Further, even when credibility is low and, for example, the focusing control by the phase difference AF method is performed or the focusing control is shifted to the focusing control by the contrast AF method, a calculation amount as much as an amount that the correlation calculation is not performed is reduced and thus, power consumption may be reduced.

The disclosed image capturing apparatus may have a configuration wherein the matching degree generation unit divides an AF area set on an image capturing surface of the image capturing element into a plurality of blocks to obtain the matching degree using the detection signals of the respective signal detection units of the first and second pairs present in the block in the respective blocks, the credibility determination unit determines the credibility based on the matching degree for each block, and the focusing control unit performs the focusing control by the phase difference AF method using the detection signals of the signal detection units present in the block except for the block in which the credibility is lower than a threshold among the plurality of blocks.

With such a configuration, the focusing control by the phase difference AF method may be performed except for the block in which credibility is low within the AF area and thus, accuracy of focusing control may be improved.

A disclosed focusing control method is a focusing control method performed by an image capturing apparatus including an image capturing element configured to capture an image of a subject through an image capturing optical system, wherein the image capturing element comprises signal detection units having first signal detection units and second signal detection units, each of the first signal detection units is configured to detect a signal according to one of a pair of light fluxes, said one and the other of the pair of light fluxes having passed through different portions of a pupil area of the image capturing optical system, and each of the second signal detection units is configured to detect a signal according to the other of the pair of light fluxes, wherein the focusing control method comprising: a focusing control step of performing a focusing control of the image capturing optical system by a phase difference AF method using the detection signals of the first signal detection units and the second signal detection units; a matching degree generation step of generating a first matching degree which corresponds to a matching degree of two images captured by a first pair using the detection signals of the respective signal detection units of the first pair, wherein the first pairs is a pair of a first signal detection unit group of a plurality of the first signal detection units parallel in a phase difference detection direction by the first signal detection unit and the second signal detection unit and a signal detection unit group of the second signal detection units arranged to be spaced apart by a same distance in one direction with respect to the respective signal detection units of the first signal detection unit group, and a second matching degree which corresponds to a matching degree of two images captured by a second pair using the detection signals of the respective signal detection units of the second pair, wherein the second pairs is a pair of a second signal detection unit group of a plurality of the first signal detection units arranged to be spaced apart by a same distance in a same direction with respect to the respective signal detection units of the first signal detection unit group and parallel in the phase difference detection direction and a signal detection unit group of the second signal detection units arranged to be spaced apart by a same distance in another direction different from the one direction with respect to the respective signal detection units of the second signal detection unit group; and a credibility determination step of determining credibility of the focusing control by the phase difference AF method using the detection signals of the respective signal detection units of each of the first pair and the second pair based on the first matching degree and the second matching degree.

With such a method, credibility of the focusing controlled by the phase difference AF method may be determined using only the signal detection unit and thus, the credibility determination may be performed at high speed.

The present invention is applied to, such as a digital camera, high conveniently and effectively.

What is claimed is:

1. An image capturing apparatus, comprising:
    an image capturing element configured to capture an image of a subject through an image capturing optical system, wherein the image capturing element comprises signal detection units having first signal detection units and second signal detection units, each of the first signal detection units is configured to detect a signal according to one of a pair of light fluxes, said one and the other of the pair of light fluxes having passed through different portions of a pupil area of the image capturing optical system, and each of the second signal detection units is configured to detect a signal according to the other of the pair of light fluxes;
    a focusing control unit configured to perform a focusing control of the image capturing optical system by a phase difference AF method using the detection signals of the first signal detection units and the second signal detection units;
    a matching degree generation unit configured to generate
        a first matching degree which corresponds to a matching degree of two images captured by a first pair using the detection signals of the respective signal detection units of the first pair, wherein the first pair is a pair of a first signal detection unit group of a plurality of the first signal detection units parallel in a phase difference detection direction by the first signal detection unit and the second signal detection unit and a signal detection unit group of the second signal detection units arranged to be spaced apart by a same distance in one direction with respect to the respective signal detection units of the first signal detection unit group, and
        a second matching degree which corresponds to a matching degree of two images captured by a second pair using the detection signals of the respective signal detection units of the second pair, wherein the second pair is a pair of a second signal detection unit group of a plurality of the first signal detection units arranged to be spaced apart by a same distance in a same direction with respect to the respective signal detection units of the first signal detection unit group and parallel in the phase difference detection direction and a signal detection unit group of the second signal detection units arranged to be spaced apart by a same distance in another direction different from the one direction with respect to the respective signal detection units of the second signal detection unit group; and
    a credibility determination unit configured to determine credibility of the focusing control by the phase difference AF method using the detection signals of the respective signal detection units of each of the first pair and the second pair based on the first matching degree and the second matching degree.

2. The image capturing apparatus according to claim 1, wherein the image capturing element includes a plurality of signal detection unit pairs having first signal detection unit pairs and second signal detection unit pairs,
    each of the signal detection unit pairs is a pair of the first signal detection unit and the second signal detection unit arranged in a direction intersecting with the detection direction with respect to the first signal detection unit, a positional relationship between the first signal detection unit and the second signal detection unit in the first signal detection unit pair is in reverse to that in the second signal detection unit pair, the image capturing element includes a pair line in which the first signal detection unit pairs and the second signal detection unit pairs are alternately parallel in the detection direction, and the matching degree generation unit obtains the first matching degree and the second matching degree by setting the first signal detection unit pairs included in the pair line as the first pair and setting the second signal detection unit pairs included in the pair line as the second pair, or by setting one group as the first pair and the other group as the second pair in a state where the signal detection units included in the pair line are divided into two groups, each of the groups are a group of the signal detection units located at a same position in a direction orthogonal to the detection direction.

3. The image capturing apparatus according to claim 1, wherein the matching degree generation unit generates a result of correlation calculation between detection signal groups output from each of two signal detection unit groups constituting the first pair as the matching degree of two images captured by the first pair, and the matching degree generation unit generates a result of correlation calculation between detection signal groups output from each of two signal detection unit groups constituting the second pair as the matching degree of two images captured by the second pair.

4. The image capturing apparatus according to claim 1, wherein the matching degree generation unit generates a ratio of an integrated value of the detection signals of the first signal detection units and an integrated value of the detection signals of the second signal detection units output from two signal detection unit groups constituting the first pair as the matching degree of two images captured by the first pair, and the matching degree generation unit generates a ratio of an integrated value of the detection signals of the first signal detection units and an integrated value of the detection signals of the second signal detection units output from two signal detection unit groups constituting the second pair as the matching degree of two images captured by the second pair.

5. The image capturing apparatus according to claim 1, wherein the matching degree generation unit divides an AF area set on an image capturing surface of the image capturing element into a plurality of blocks to obtain the matching degree using the detection signals of the respective signal detection units of the first and second pairs present in the block in the respective blocks, the credibility determination unit determines the credibility based on the matching degree for each block, and the focusing control unit performs the focusing control by the phase difference AF method using the detection signals of the signal detection units present in the block except for the block in which the credibility is lower than a threshold among the plurality of blocks.

6. A focusing control method performed by an image capturing apparatus including an image capturing element configured to capture an image of a subject through an image capturing optical system, wherein the image capturing element comprises signal detection units having first signal detection units and second signal detection units, each of the first signal detection units is configured to detect a signal according to one of a pair of light fluxes, said one and the other of the pair of light fluxes having passed through different portions of a pupil area of the image capturing optical system, and each of the second signal detection units is configured to detect a signal according to the other of the pair of light fluxes, wherein the focusing control method comprising:

a focusing control step of performing a focusing control of the image capturing optical system by a phase difference AF method using the detection signals of the first signal detection units and the second signal detection units;

a matching degree generation step of generating a first matching degree which corresponds to a matching degree of two images captured by a first pair using the detection signals of the respective signal detection units of the first pair, wherein the first pairs is a pair of a first signal detection unit group of a plurality of the first signal detection units parallel in a phase difference detection direction by the first signal detection unit and the second signal detection unit and a signal detection unit group of the second signal detection units arranged to be spaced apart by a same distance in one direction with respect to the respective signal detection units of the first signal detection unit group, and a second matching degree which corresponds to a matching degree of two images captured by a second pair using the detection signals of the respective signal detection units of the second pair, wherein the second pairs is a pair of a second signal detection unit group of a plurality of the first signal detection units arranged to be spaced apart by a same distance in a same direction with respect to the respective signal detection units of the first signal detection unit group and parallel in the phase difference detection direction and a signal detection unit group of the second signal detection units arranged to be spaced apart by a same distance in another direction different from the one direction with respect to the respective signal detection units of the second signal detection unit group; and a credibility determination step of determining credibility of the focusing control by the phase difference AF method using the detection signals of the respective signal detection units of each of the first pair and the second pair based on the first matching degree and the second matching degree.

\* \* \* \* \*